April 8, 1924.
L. N. HAMPTON
FLUID TRANSFER DEVICE
Filed Feb. 21, 1920     10 Sheets-Sheet 1
1,489,348
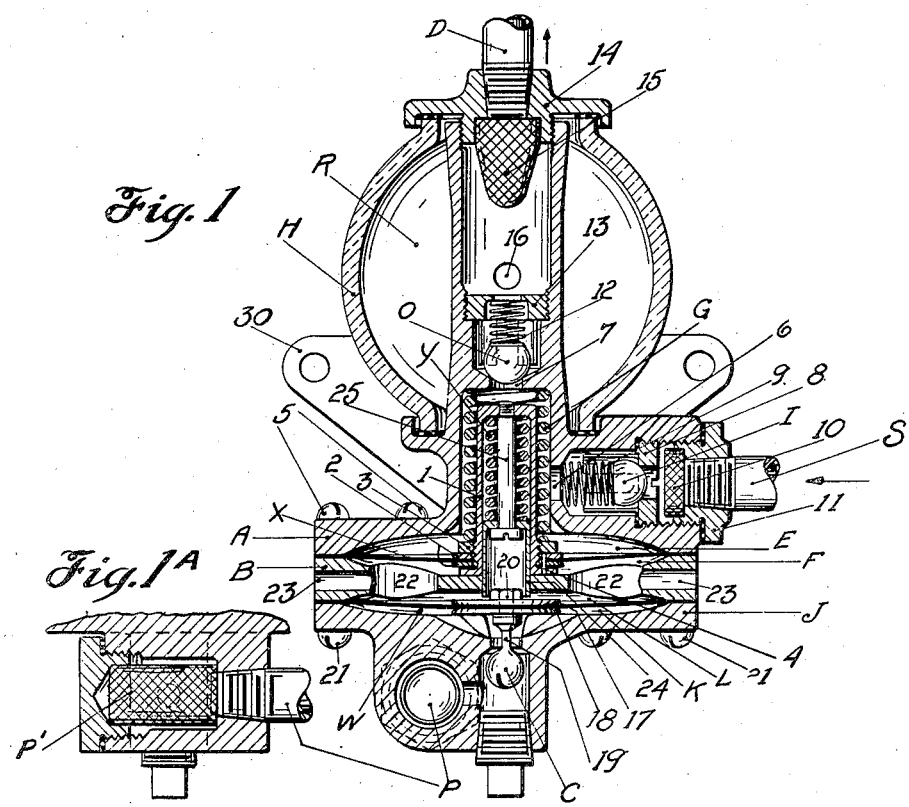
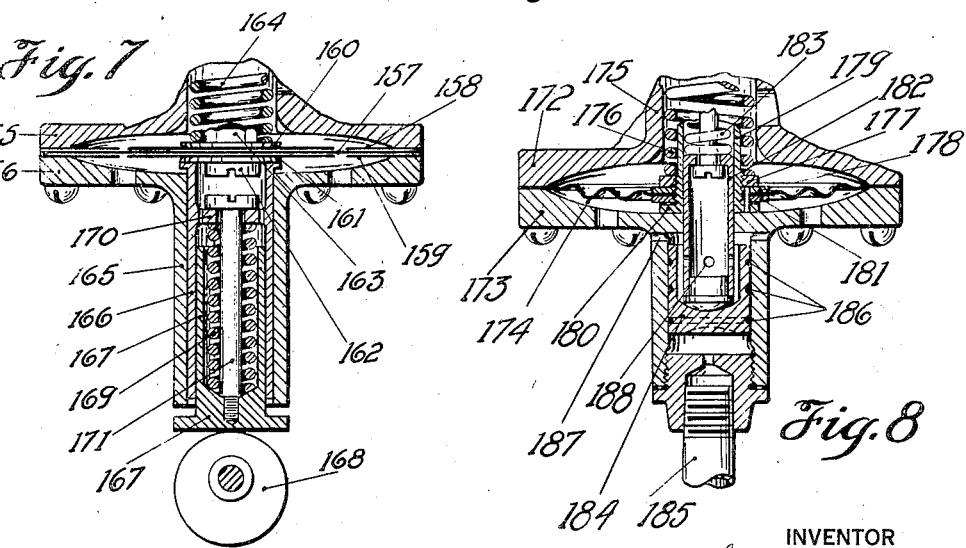
INVENTOR
Leon N. Hampton
BY
Riddell & Marqueson
ATTORNEYS April 8, 1924.
L. N. HAMPTON
1,489,348
FLUID TRANSFER DEVICE
Filed Feb. 21, 1920    10 Sheets-Sheet 2
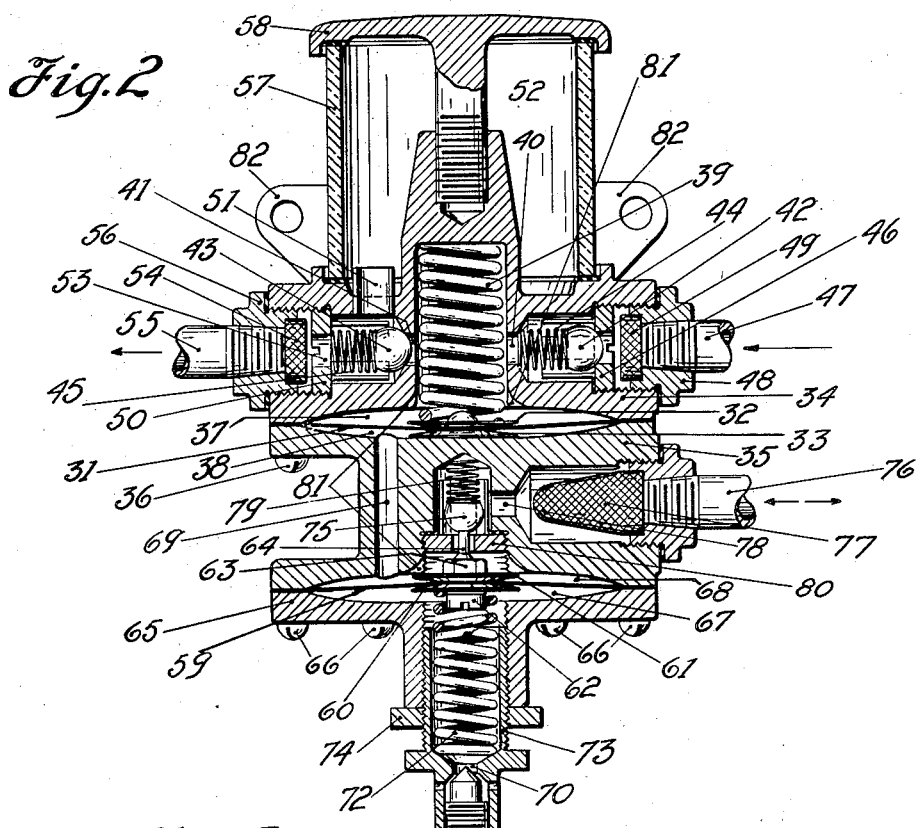
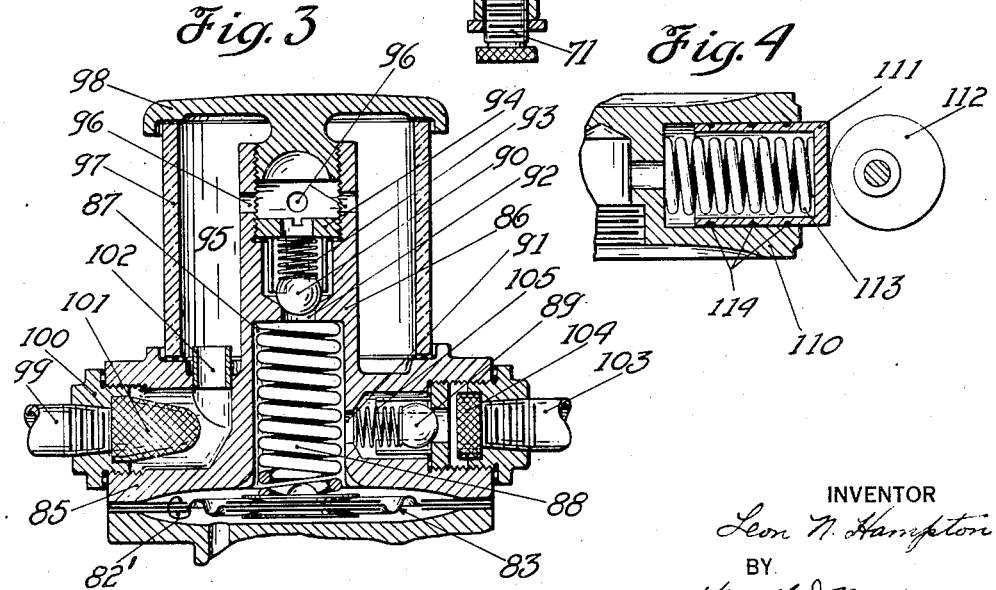
INVENTOR
Leon N. Hampton.
BY
Kiddle & Margeson.
ATTORNEYS April 8, 1924.
L. N. HAMPTON
FLUID TRANSFER DEVICE
Filed Feb. 21, 1920    10 Sheets-Sheet 3
1,489,348
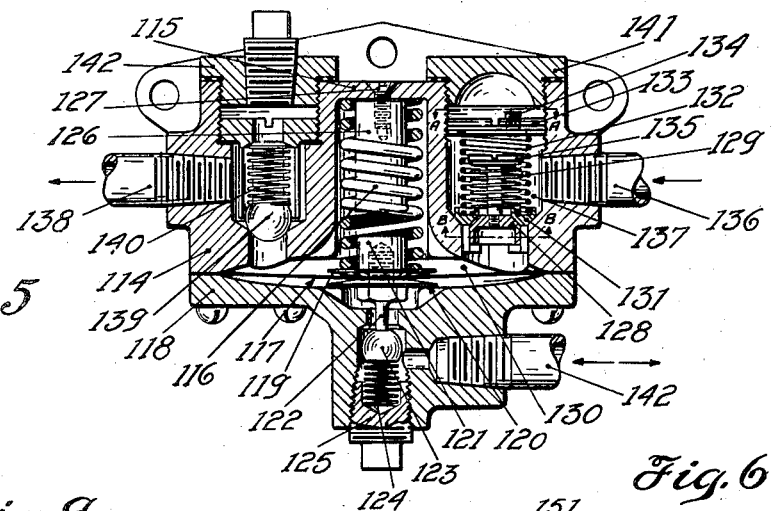
*Fig. 5*
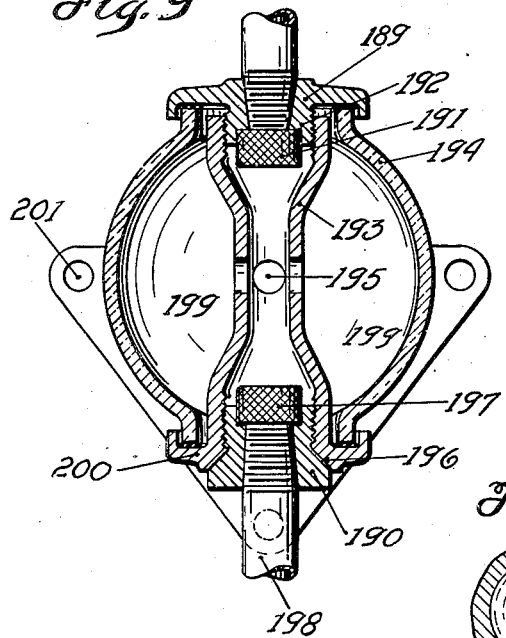
*Fig. 9*
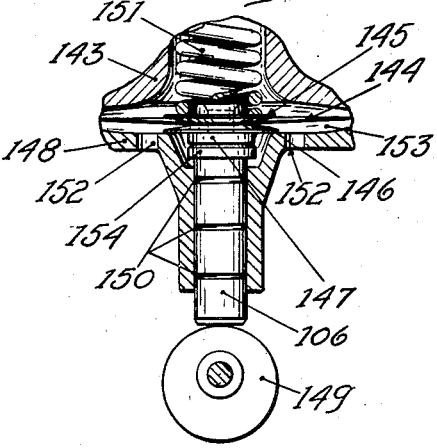
*Fig. 6*
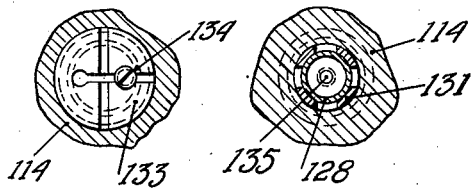
*Fig. 5ᴬ*  *Fig. 5ᴮ*
INVENTOR
Leon N. Hampton.
BY
Kiddle & Margeson.
ATTORNEYS

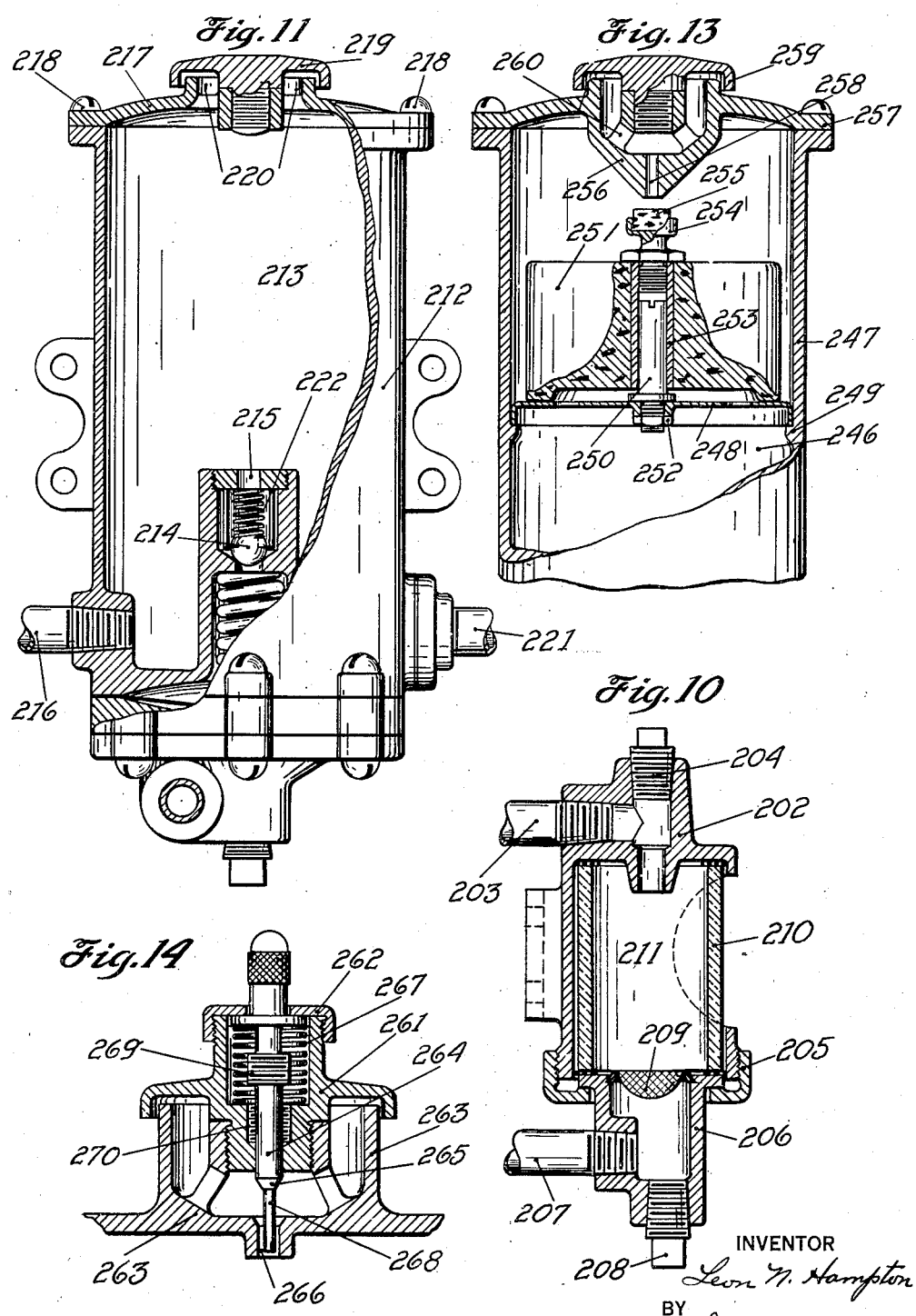

April 8, 1924.

L. N. HAMPTON

FLUID TRANSFER DEVICE

Filed Feb. 21, 1920   10 Sheets-Sheet 5

1,489,348

INVENTOR
Leon N. Hampton.
BY
Kiddle & Margeson.
ATTORNEYS

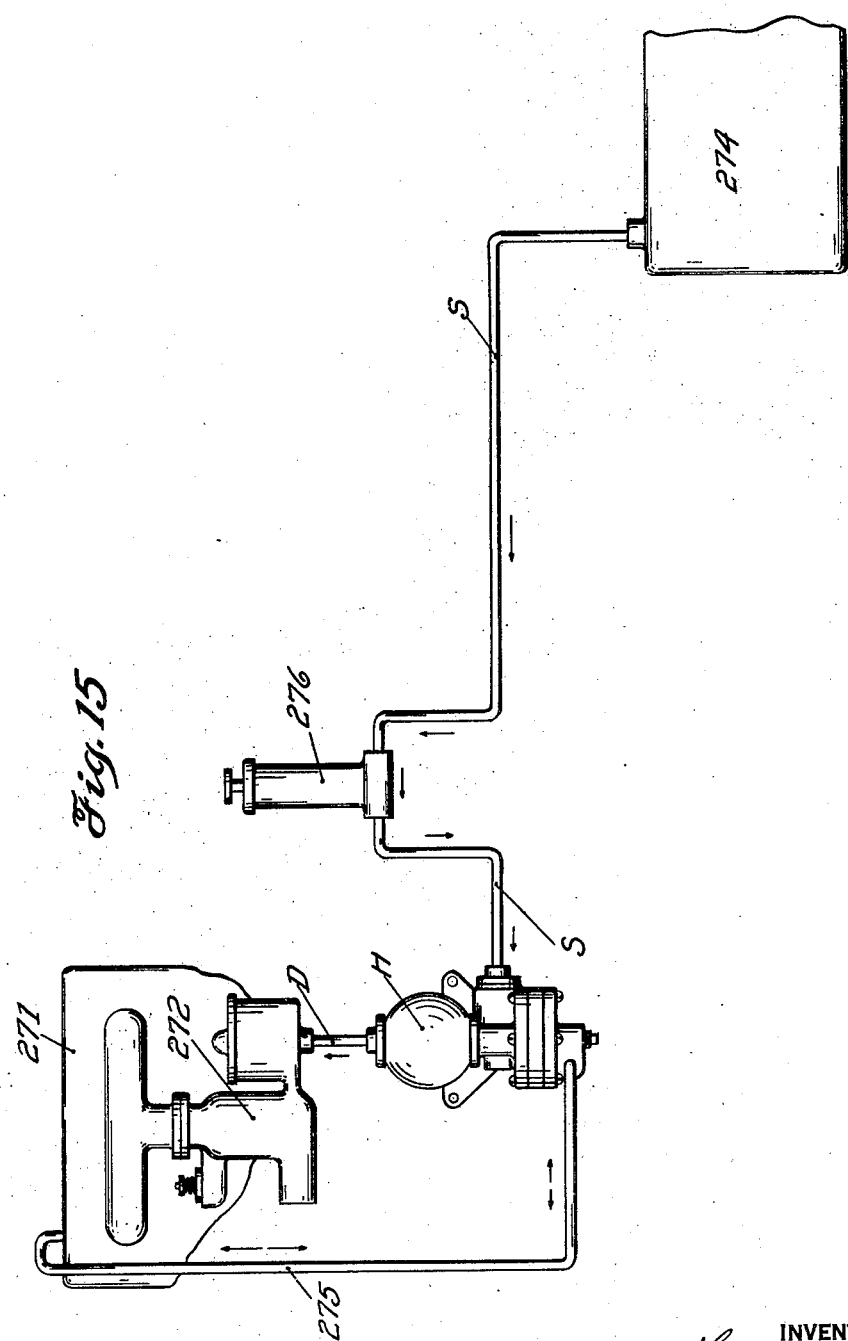

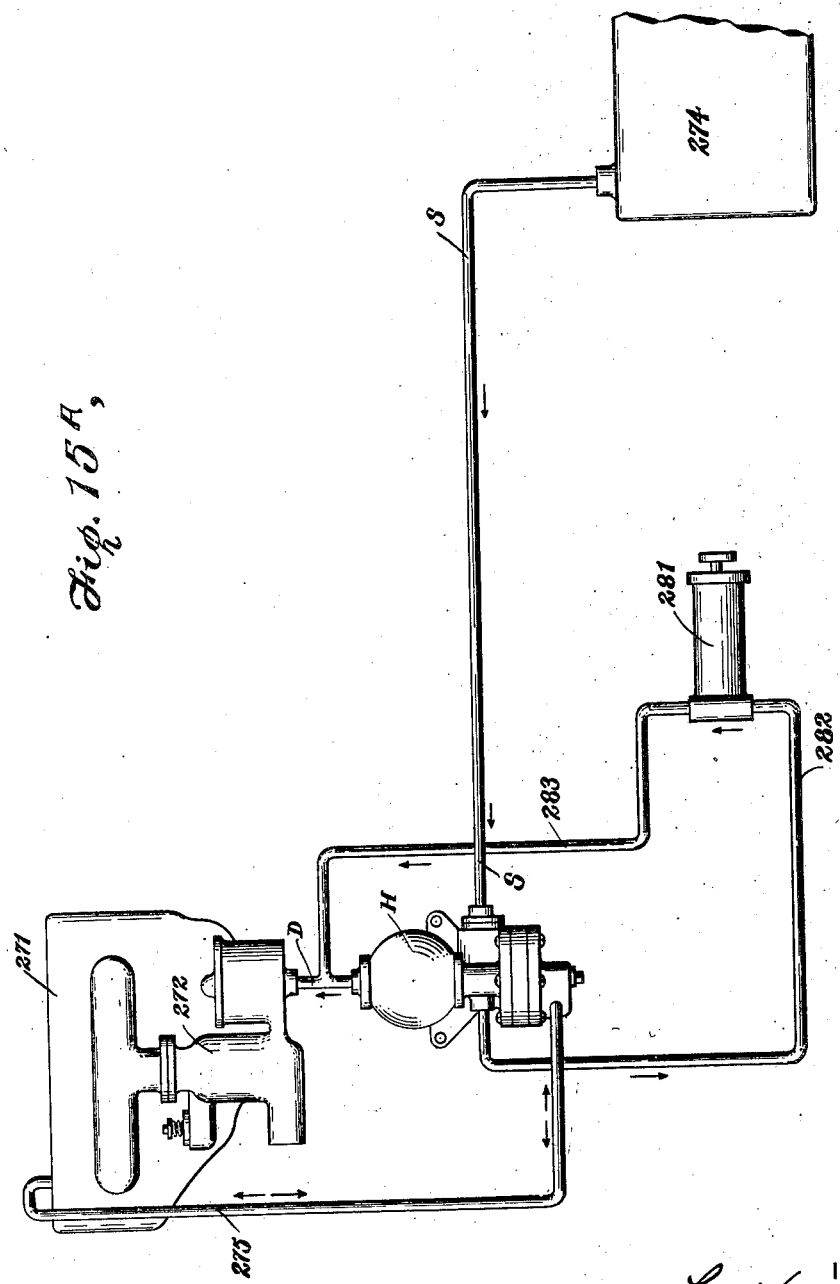

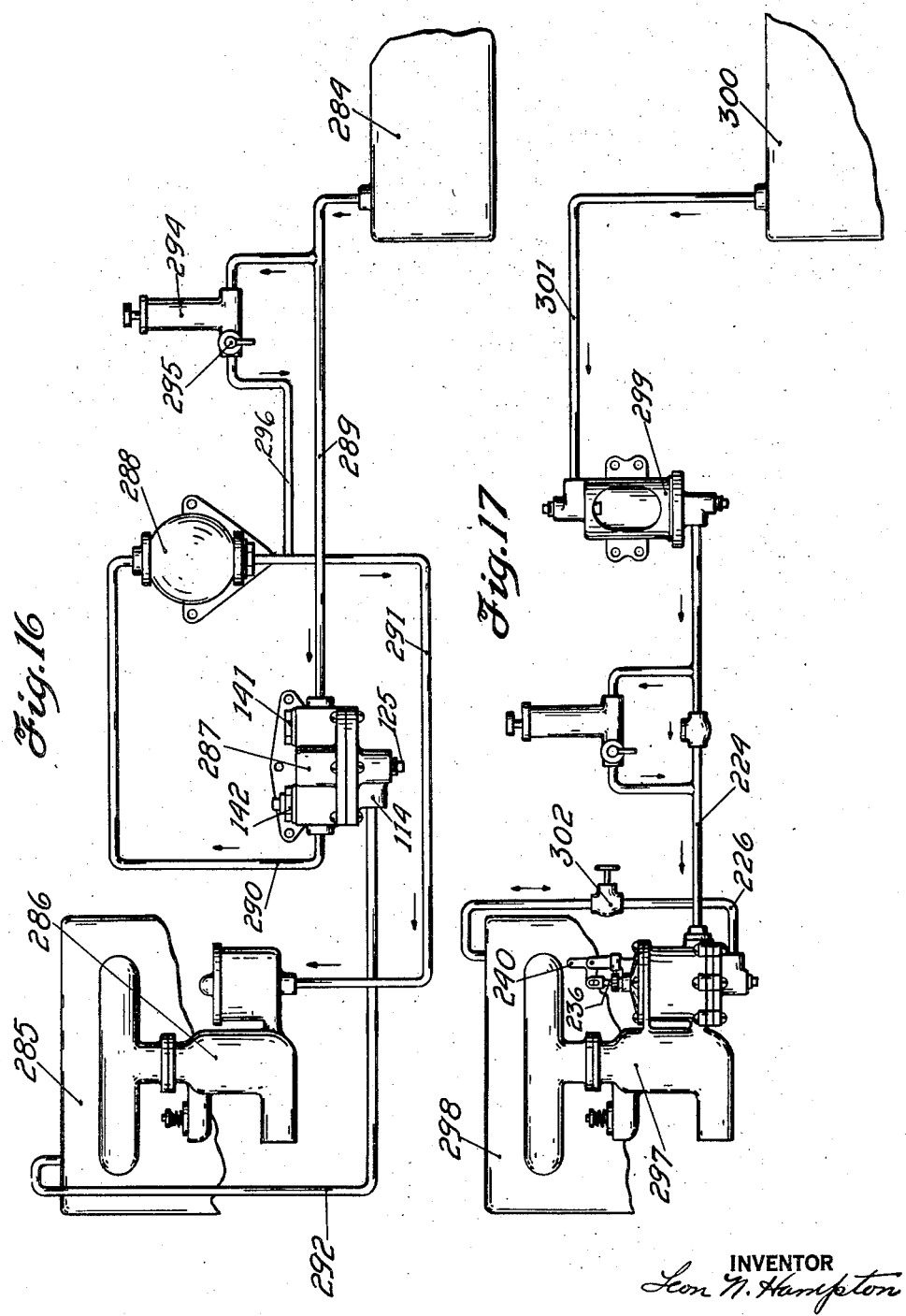

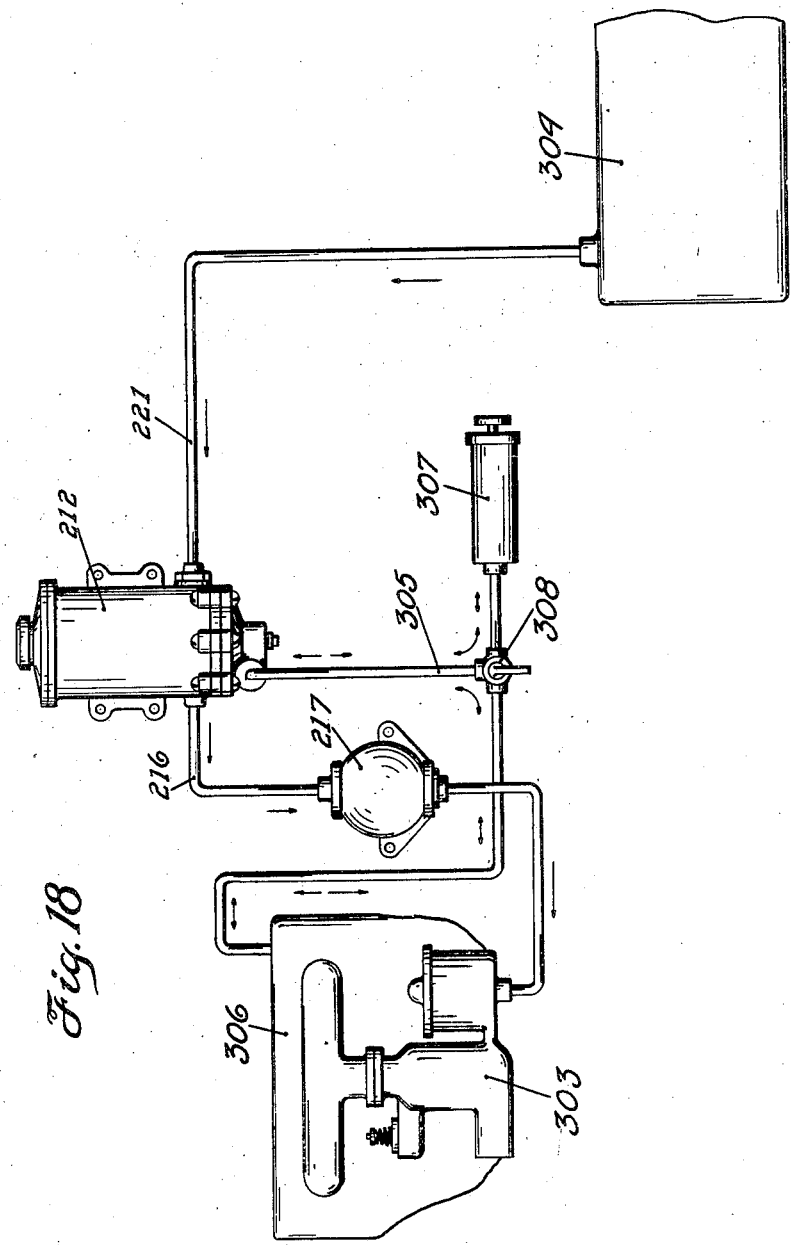

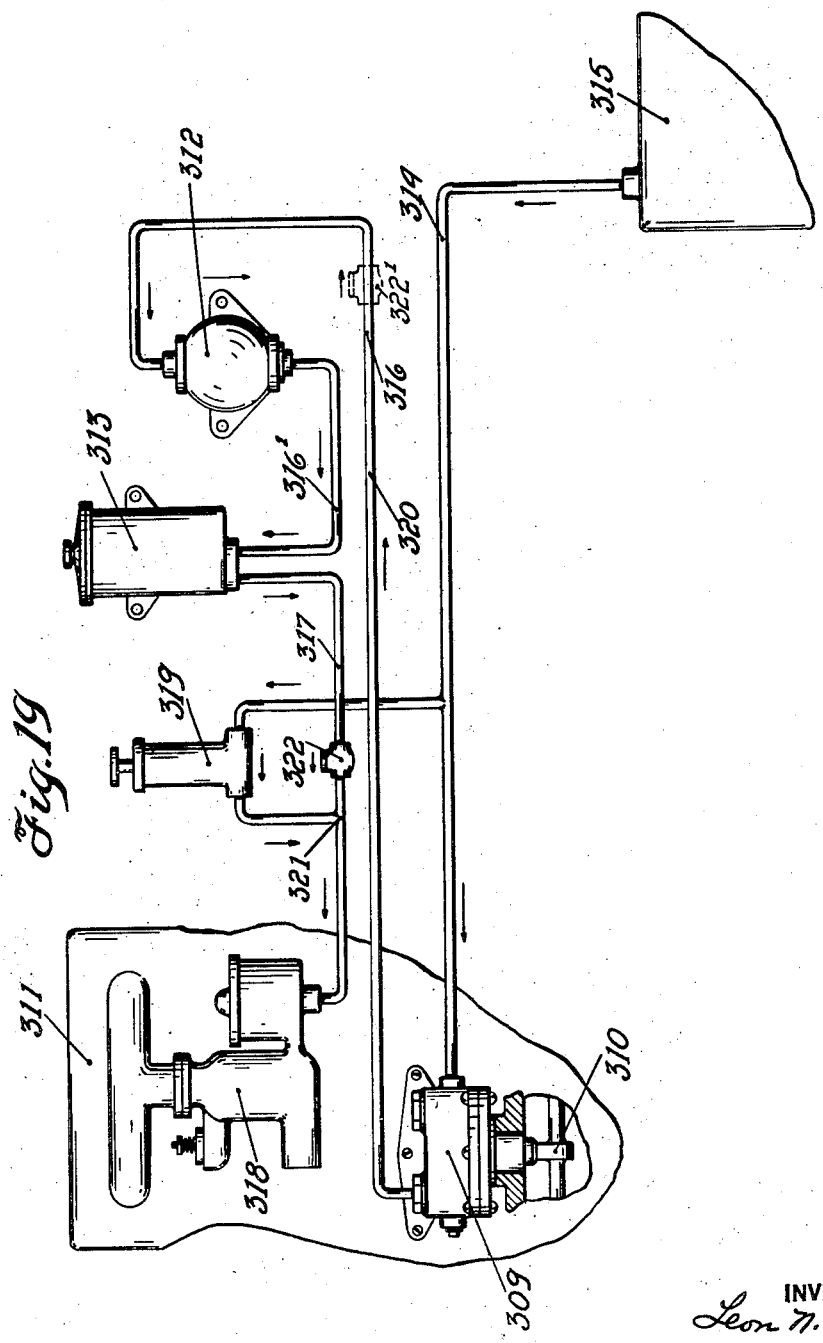

Patented Apr. 8, 1924.

1,489,348

UNITED STATES PATENT OFFICE.

LEON N. HAMPTON, OF NEW YORK, N. Y.

FLUID-TRANSFER DEVICE.

Application filed February 21, 1920. Serial No. 360,303.

*To all whom it may concern:*

Be it known that I, LEON N. HAMPTON, a citizen of the United States, and a resident of Bronx County, in the city and State of New York, have invented certain new and useful Improvements in Fluid-Transfer Devices, of which the following is a specification.

My invention relates to certain new and useful apparatus for transferring liquids or gases delivering them under definite and controllable pressure either directly to the receiving means or first to a supplementary tank from which the receiving means will be fed by gravity. More particularly, my invention provides a self feeding carbureter in that novel means are provided for causing liquid fuel to flow under control from the supply tank to the carbureter of an internal combustion engine, either delivering the fuel directly under any predetermined pressure or indirectly from a supplementary tank by gravity. Although my invention is useful in such service, it should not be so limited as it will be apparent that it can be used to advantage in many other places, such as the actuating member in pressure-feed lubricating systems for causing forced circulation of a lubricant and for supplying liquids or gases to jets or burners or other mechanism in which it is desirable to deliver the liquid or gas under a definite pressure either built up or gravitational.

More in detail, and speaking now of its use in connection with internal combustion engines, my invention provides a device for transferring liquid fuel from a supply tank to a carbureter, either directly or indirectly. In transferring fuel to a carbureter, in one embodiment of my invention the fuel passes from the supply tank through my transfer apparatus into a supplementary tank, and from this tank to the carbureter by gravity.

The supplementary tank may either be integral with the transfer unit or remotely connected to it. It is evident, however, that in any case this supplementary tank must be higher than the carbureter in order to produce a flow by gravity.

In the embodiment of my invention in which the fuel is forced directly from the supply tank to the carbureter, the transfer device need not be placed above the carbureter, gravity not being depended upon for discharge, nor need it necessarily be above the supply tank because its inlet and outlet check valves are normally held closed by a positive means, which need only yield to the pulsations of the pumping unit, thus preventing an uncontrolled flow through the device. As a matter of fact, in the present invention the apparatus functions without regard to the relative positions of the supply, the transfer device and the receiving means, and without regard to the position these devices may be in as a whole. These points are of decided advantage because they make the apparatus universal inasmuch as they facilitate installation and insure a positive flow under all conditions, providing a device adaptable to vehicle, aeronautical, marine and stationary installations.

Other objects and desirable features of my invention will appear.

Another object of the present invention is to produce a system which will function properly regardless of what angle it may be operating in and irrespective of the amount of the supply it is acting upon.

Another object is to provide a system that will function with a minimum variation of delivery pressure having a constant and uniform discharge.

Another object is to eliminate the possibility of the substance being transferred passing directly to the source of pressure by which the device is operated.

Another object is to provide a system that will reduce the possibility of the spread of the substance being transferred to a minimum.

Another object is to produce a device, the delivery pressure of which can be readily adjusted.

Another object is to produce a system which when used in connection with internal combustion engines, will function properly without regard to the speed of the motor with respect to its throttle.

A still further object is to provide a simple automatic apparatus such as can be installed, operated and maintained successfully and inexpensively by the average individual.

A still further object of my invention is to provide a device of the character described wherein frictional losses due to wearing parts is reduced to a minimum, thereby eliminating the danger of failure of the device from this cause.

Another object of the present invention is to provide a device which by the aid of an auxiliary pump, can be primed or the receiver, a carbureter for example, be flooded from a remote point.

I have shown two general ways of operating my device: one by a fluctuating pressure and the other by mechanical means. Each of these methods can be divided into two classes: one supplying the receiving means under built-up pressure, and the other under gravitational pressure.

In supplying the receiving means by built-up pressure, the pressure head employed may be integral with the pumping member forming a part of the transfer device or remotely connected to it for the purpose of observation, and in less exacting installations may be omitted entirely.

In supplying the receiving means under gravitational pressure the substance being transferred may be transferred solely under the pressure of gravity or if desired either gravitational or built-up pressure.

The pumping member forming a part of the transfer device is essentially a diaphragm pump. This construction eliminates sliding joints and decreases the possibility of a loss of suction or the spread of dangerous fuels. It also forms a material barrier which makes it impossible for the substance being transferred to pass directly into the source of pressure by which the diaphragm is vibrated. It is of simple and tried-out construction which has proven that it will operate successfully and practically indefinitely without any attention.

The valves employed are in general of the ball type—a construction which has also proven its merit. The valves are held closed by a positive means other than their weight which insures in the case of the built-up pressure systems that the device will operate successfully in any position relative to the supply or receiving means, and thus overcomes the possibility of an uncontrolled flow through the device.

Control is obtained by the action of a diaphragm and control valve which shuts off the pressure after sufficient has been introduced to the device to produce the desired result. I may, if desired, employ a simple yielding construction which will permit of the transmission of only a predetermined pressure to the pumping member, or a yielding control valve in the pumping chamber itself.

In the accompanying drawings,—

Fig. 1 shows an elevation in section of an embodiment of my invention wherein fluctuating pressure is employed for operation, the pressure head in this instance being transparent and the whole device constituting a unitary structure;

Fig. 1A is a detail view showing the pressure supply pipe and screen at the discharge end thereof;

Fig. 2 is an elevation in section of another embodiment of my invention wherein the source of fluctuating pressure is introduced directly to both the control and pumping diaphragms;

Fig. 3 shows in sectional elevation a modification of Fig. 2;

Fig. 4 shows a modification wherein a cam and plunger are employed for creating the fluctuating pressure that operates the pumping diaphragm;

Fig. 5 shows an embodiment of my invention wherein no pressure head is employed and but one diaphragm, control being obtained by a control valve in the pumping chamber;

Figs. 5A and 5B are detail views of the setting device and inlet valves, respectively, of Fig. 5;

Fig. 6 shows in sectional elevation a modified form of my device wherein a cam and plunger are employed for operating the pumping diaphragm;

Fig. 7 shows in sectional elevation a means for operating the pumping diaphragm wherein a yielding plunger and cam are employed and wherein the diaphragm employed is of an improved construction;

Fig. 8 shows in sectional elevation a form of device wherein fluctuating pressure is employed and wherein the diaphragm used is of modified form, a piston under the action of the fluctuating pressure vibrating the pumping diaphragm;

Fig. 9 illustrates in sectional elevation a form of pressure head which I may employ when it is desired to have the same remotely connected;

Fig. 10 shows in sectional elevation still another modified form of pressure head;

Fig. 11 shows in part sectional elevation a tank employed when the receiving means is supplied under gravitational pressure;

Fig. 12A being a section on the line A—A of Fig. 12;

Fig. 13 illustrates an embodiment of my invention in which the receiving means is supplied under built-up pressure, means having been provided, however, whereby gravitational pressure may be employed until the built-up pressure becomes effective;

Fig. 14 is a fragmentary view of means adapted for use by merely slightly modifying Fig. 13;

Fig. 15 shows more or less diagrammatically my fluid transfer device as illustrated in Fig. 1 installed for use in transferring fuel from a supply tank to the carbureter of an internal combustion engine;

Fig. 15A shows diagrammatically another method by which the fluid transfer device of Fig. 11 may be employed in transferring fluid from a supply tank to a carbureter;

Fig. 16 shows an installation wherein the devices of Figs. 5 and 9 are employed;

Fig. 17 shows an installation wherein the device of Fig. 12 is employed;

Fig. 18 shows an installation wherein the apparatus of Fig. 11 is employed; and

Fig. 19 shows an installation wherein my device is employed and is mechanically operated.

Figure 12:
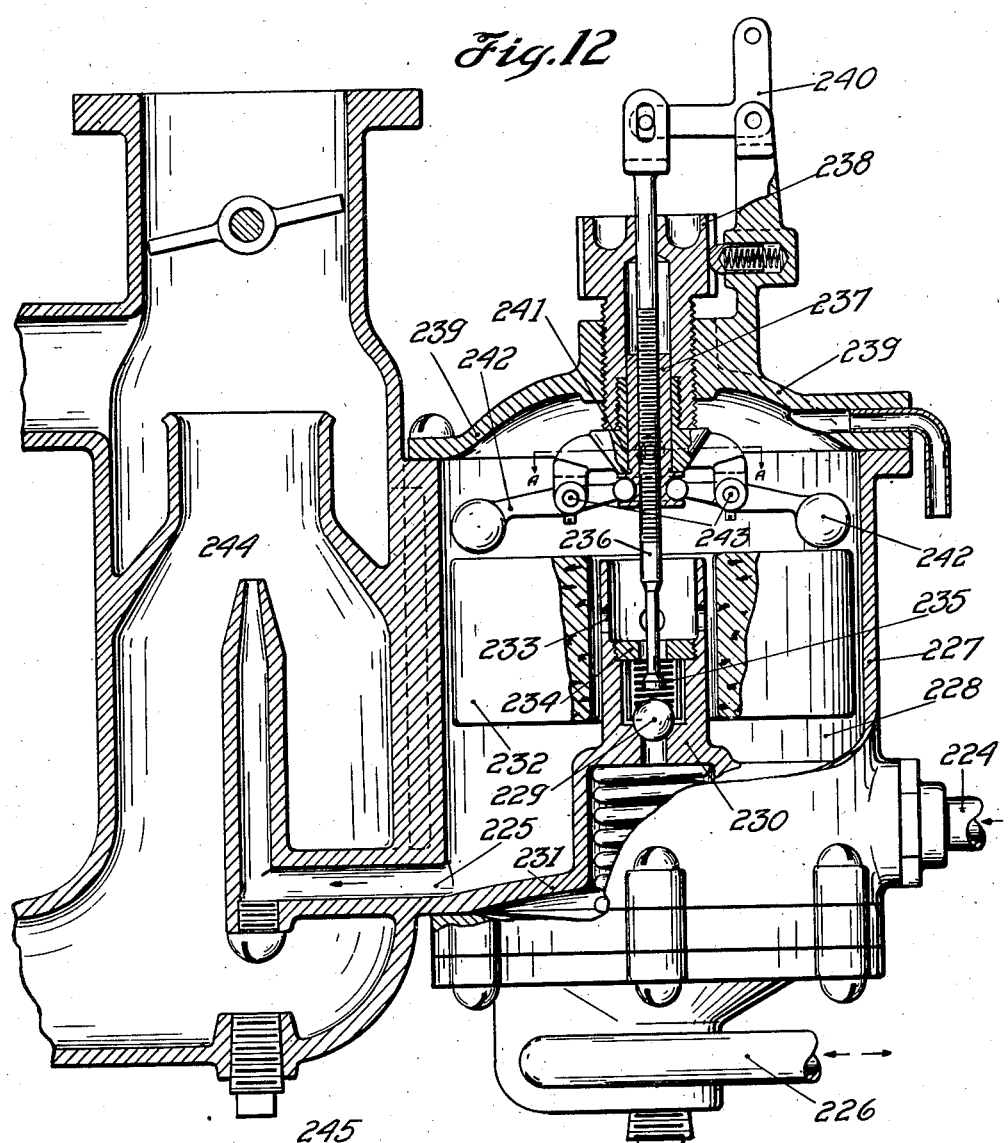
Figs. 12 and 12A illustrate in part sectional elevation an embodiment of my invention wherein my device is incorporated in a carbureter.
Figure 12A:
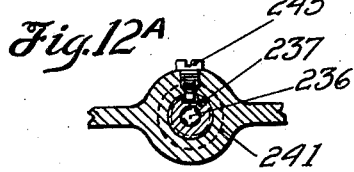

Referring to the drawings in detail and first of all to Fig. 1, I have here illustrated an embodiment of my invention wherein the fluid is transferred by a device operated by a fluctuating pressure and one in which the pressure head is transparent and integral with the transfer or pumping device.

I have here employed two diaphragms, one a pumping diaphragm and the other a control diaphragm, the latter governing the action of the former through a flexible coupling which will transmit only the desired pressure to the pumping diaphragm. The control diaphragm also carries a control valve, which operating automatically, permits only enough pressure to enter the chamber in which the control diaphragm is mounted to move the control diaphragm its full stroke.

The diaphragm X of the pumping member is a simple disk made of phosphor bronze, vanadium steel or other suitable diaphragm material. At its center this diaphragm carries a cupped shaped plunger 1 and two disks 2, these disks being clamped to the diaphragm by means of a circular nut 3 and the plunger 1 which in this connection acts as a stud. A gasket is provided between the shoulder of the plunger and a disk adjacent to it, and when the nut 3 is tightened it draws the diaphragm, disks and plunger into an air-tight unit. To prevent the nut turning the disks while it is being tightened, I have provided a pin 4 which is securely fastened in the plunger and passes through clearance holes in the disks. The diaphragm is clamped at its periphery between the members A and B by the screws 5. The members A and B are shown as castings dished to form a recess in which the diaphragm X is free to vibrate. These members are also dimensioned in such a way as to limit the travel of the diaphragm in both directions to the desired stroke. The pumping diaphragm divides the recess in the casting into the chambers E and F and forms an air-tight seal between them. The chamber E is recessed to receive the cupped plunger 1 and the compression spring G which encircles the plunger. This spring normally keeps the pumping diaphragm unit pressed against the stopping surface of the member B. There are two ports 6 and 7 in the recess receiving the plunger 1, in the member A, the former leading to a positively closed or controlled inlet check valve I, and the latter to a positively closed or controlled outlet or discharge check valve O. Each of these valves are of the ball type fitted to metal seats and normally held closed by a compression spring. The inlet check valve I is shown in a horizontal position and is held positively against its seat in a plug 8 by a spring 9. This plug is screwed into the member A seating on a gasket intermediate the plug and the casting. Since this makes an air-tight joint, the only access to the pumping chamber, i. e., the chamber in which the pumping diaphragm is located, at this point is through the inlet check valve I. This valve, however, being normally held closed blocks any outward flow from the pumping chamber and will only yield to such inward pressures that are capable of overcoming the spring 9. A cupped shaped screen 10 is held in the valve cap 11 intermediate the valve and the pipe S. This pipe is tightly screwed into the valve cap and the cap is brought down upon a gasket, so the only passageway to the valve is through the pipe S which is connected to the supply. It is clear then that any flow past the inlet check valve will be from the supply via the pipe S, through the screen 10 and by the valve into the pumping chamber E. The outlet check valve O is shown vertically disposed and works the opposite to the inlet check valve but is of similar construction. The valve O is seated in the member A and is held positively against its seat by the spring 12. This spring is retained by the cap 13 which is screwed into the member A. The cap has a port at its center which gives the outlet check valve chamber access to the cylindrical and centrally located projection or column of the member A which extends through a pressure head H and gives purchase to the cap 14. This cap clamps the pressure head H tightly to the casting A and since there are gaskets between the cap and the pressure head and the pressure head and the casting, it forms an air-tight pressure head chamber R. There is a conical screen 15 held in the cap 14 for the purpose of arresting any foreign matter which may have passed the screen 10. The pipe D which leads to the receiving means is screwed tightly into the cap 14. The ports 16 centrally located in the projection of the member A and which ports lead to the pressure head chamber R are as close as possible to the geometrical center of the pressure head and connect it with the inside of the projection of the member A which houses the outlet check valve O. It is evident that since the outlet check valve O is seated directly in the member A, the only flow past this valve will be from the pumping chamber outward and only on condition that the pressure tending to produce the flow is sufficient to overcome the spring 12. Any flow past this valve may either pass through the ports 16 into the chamber R where it will be confined, or through the screen 15 to the pipe D and hence to the consumer.

The control diaphragm W is similar to the pumping diaphragm X, being of the simple disk form, carrying at its center the disks 17 and 18 and the valve releasing pin 19 which, together with a control valve C, are, in effect, integral with the disk 17, the valve releasing pin in this connection acting as a bolt and with the aid of the nut 20 tightly clamping the diaphragm and disks together, making the control diaphragm an air-tight unit. Although I have shown a specific form of control valve it is to be understood that other types of control valves such as referred to hereinafter may be employed to advantage. The control diaphragm is clamped at its periphery between the members B and J by screws 21. This is an air-tight joint. The members B and J form a recess in which the diaphragm is free to vibrate. The control diaphragm divides the recess into the chambers K and L which are isolated from each other. The chambers L and F are, however, connected by the ports 22 and the ports 23 in turn, give both of these chambers free access to the air. The control diaphragm is limited in its downward movement by the recess in which it is located, but is limited in the opposite movement by the seating of the control valve C.

The piston 24 which slides within the cupped plunger 1 is held in place against the action of a spring Y by the stud 25 which is screwed into the plunger. This forms a yielding piston unit with the pressure of the spring acting upon the piston, being self-contained within the unit, while in its normal position. The spring Y must be stronger than the spring G. The piston 24 acts against the control diaphragm unit and normally forces it against the stopping surface of the member J.

The valve releasing pin 19 is long enough to normally force the control valve C off its seat, but when the control diaphragm, being in effect integral with the valve releasing pin and the control valve, is moved through its stroke, the valve C seats and forms an air-tight seal between the chamber K and a pipe P provided for the purpose of introducing fluctuating pressure directly to the diaphragm unit and control valve C, a screen P' being provided intermediate the pipe P and the valve C (see Fig. 1^A). The control valve is normally held open. It is clear then, that the pipe P normally has access through the open control valve to the chamber K, and that since there is no other opening, any and all of the pressure introduced to the control diaphragm will be confined within the control diaphragm chamber K, and that after a predetermined pressure is reached in this chamber, the valve C will be seated to prevent entrance of additional pressure to the chamber. In other words a selective control is provided for the pressure admitted to the diaphragm W.

For the purpose of mounting, I have shown the bracket 30 which is part of the member A and by which the device can be mounted as desired.

While I have shown the chambers L and F joined together by the port 22 and this port in turn connected to the air by the port 23, it is obvious that these chambers need not be connected together at all as obviously they may be by-passed to the open air individually through separate ports or they may be confined chambers without any outlet to the air.

It will be evident from the detailed description thus far given that the following conditions exist when the elements of the device are in their normal relations:

Both the inlet and outlet check valves are closed.

The pumping diaphragm unit is so disposed with relation to the solid wall of the pumping chamber, as to give the chamber its maximum volume.

The control diaphragm unit is in such a position as to render the pressure chamber of minimum volume and to hold the control valve open.

Now, if with the device in this cycle of operation, the pressure chamber is connected to a source of fluctuating pressure by the pipe P and the pumping chamber connected to a supply by the pipe S and indirectly through the pressure head to a receiving device by the pipe D, the following action will take place:

The first impulse of pressure will enter the pressure chamber K through the open control valve C. This pressure if of sufficient value, will cause the diaphragm W to yield before it until the control valve C just closes. At this point, since the reaction of the spring Y, acting against the diaphragm, just balances the pressure in the pressure chamber, the control valve will arrest the motion of the diaphragm with practically no pressure being exerted upon the seat of the valve. If the fluctuating pressure continues to rise above this point, the tendency of the valve C which it will be seen is controlled by the fluctuating pressure will be to seat more positively, first under the direct action of the pressure, and secondly because any leak past the valve, due to insufficient pressure upon it during the point of balance, will enter the pressure chamber and all of the effect of this pressure on the diaphragm will bear directly upon the control valve. Since the spring Y holds the piston 24 against the control diaphragm, the member 24 will have to recede, due to this motion of the diaphragm. This motion of the member 24 will transmit pressure to the pumping diaphragm X through the plunger 1 and spring Y and this diaphragm will yield until the pressure resisting its motion is equal to the strength of the spring Y. Then any further motion of the piston 24 will be absorbed by the spring Y without any effect on the pumping diaphragm. The forces, resisting motion of the pumping diaphragm X, are the reaction of the spring G and any pressure built up within the pumping chamber E. It is clear, then, that the stroke of the pumping diaphragm is variable and will be dependent upon the initial pressure within the pumping chamber and the rate with which this pressure is built up by the motion of the diaphragm. Since the volume of the pumping chamber E is reduced in proportion to the stroke of the diaphragm X, the pressure in the chamber would be built up in proportion to the stroke if it were not for the fact that any pressure built up in the chamber E may pass through the outlet check valve O and the ports 16 to the pressure head chamber R and to the consumer through the pipe D, providing it is of sufficient value to overcome the spring 12. It is clear, then, that the rate by which the pressure in the pumping chamber E is built up is also dependent upon the rate by which the discharge is absorbed by the consumer, and hence the stroke of the pumping diaphragm X for each vibration of the control diaphragm W will only be sufficient to bring the delivery pressure up to the predetermined value which is fixed by the spring Y. It should be remembered at this point that the only outlet from the pumping chamber is through the outlet check valve O because the inlet check valve I seats against outward pressures. The discharge in passing into the pressure head chamber R will entrap any gas or air therein which remains after the discharge has filled the chamber sufficient to cover the ports 16, and the entrapped volume will be compressed until its pressure balances the discharge pressure. The flow from the pumping chamber will continue until the pressure the control diaphragm W exerts on the pumping diaphragm X is balanced to such an extent that it can no longer overcome the spring 12. When this condition is reached the outlet check valve O will close and cut off the discharge. It is possible that this valve might be forced open again and permit a further flow or this action might be repeated a number of times during the same stroke of the control diaphragm. The demands of the receiver will be satisfied by the discharge from the pumping chamber as long as the pressure of the discharge from this chamber does not fall below the pressure of the entrapped gas within the pressure head chamber. When this condition is reached, either through a reversal in direction of the travel of the pumping diaphragm unit or the reduction of the pressure exerted on the pumping diaphragm or the reduction of the pressure in the pumping chamber, the entrapped gas in the pressure head chamber R will expand and continue to feed the receiver until the pressure falls below that demanded by the receiver. This will keep the discharge practically constant and of uniform pressure for a predetermined period which by using the right proportions, can be made to overlap the next discharge stroke. This completes the first cycle of operation of the device.

When the fluctuating pressure has risen to its maximum, reversed and fallen again sufficiently far below normal pressure for the pressure in the pumping chamber E to overcome the force within the pressure chamber K which is tending to hold the control valve C closed, this valve will open again and the pressure in the chamber K will be released. This will relieve the pressure the control diaphragm unit W was exerting on the pumping diaphragm unit. When this pressure is relieved, the spring Y will return the control diaphragm W, valve C and the plunger 24 to their original positions, and the spring G will tend to force the pumping diaphragm X back to its normal position providing there was any deflection of this member. Any return motion of the pumping diaphragm unit X will increase the volume of the pumping chamber E and this motion will continue until the diaphragm X returns to its normal position unless the power required to reduce the pressure balances the spring G before the full return of the diaphragm. The power of the spring G, however, can be made such that it will create practically any negative pressure desired. If the fall in pressure is sufficient, the pressure acting on the supply will overcome the spring 9 and there will be a flow from the supply through the pipe S and past the inlet check valve I into the pumping chamber E. It should be remembered that the outlet check valve O seats against inward pressure. This flow will continue until the pumping chamber E is filled to such an extent that the difference in pressure in it and on the supply is no longer capable of overcoming the spring 9, then the valve I will seat under the pressure of this spring and the flow will stop. During this inlet stroke there will be no discharge from the pumping chamber but the receiver, it is obvious, will continue to be supplied by the discharge of the pressure head and as mentioned before, by properly proportioning the relative volumes of the pumping chamber and the pressure head, the receiver will be supplied under a practically constant pressure. The second cycle will be completed during this operation and this will leave the device ready to function again.

It should be noted that the vibrations of the diaphragms cause little change in volume of the combined chambers F and L when the strokes of the two diaphragms are nearly equal, and if the strokes are not nearly equal, any change in volume of these chambers can have little effect on the pressure in the chambers because they have free access to the air through the ports 23.

Another point to be noted is that when the pumping diaphragm X is in its normal position, it holds the control diaphragm W to within a clearance dimension of the stopping surface of the member J. With this in mind it is clear that if the pressure continues to fall off after the diaphragms return to their normal positions and eventually falls below atmospheric pressure, the control diaphragm unit will merely traverse this clearance and be forced against the stopping surface of the member J and remain there until the pressure has reversed and risen again enough to restore it to its normal position.

The cycles of operation will continue, as described above, as long as the fluctuating pressure is introduced to the device, that is, the control diaphragm will continue to cause the pumping diaphragm to vibrate and by alternating the pressures within the pumping chamber cause a flow from the supply to the consumer and this flow will be so governed as to keep the delivery pressure constant and of a predetermined value.

The stroke of the control diaphragm will be proportional to the fluctuating pressure, or pressures, the characteristics of which are not capable of moving it its full stroke. Sufficient pressure, however, will usually be on hand to move the control diaphragm its full stroke and therefore its stroke will be practically constant.

The stroke of the member 24 will be equal to the stroke of the control diaphragm unit at all times but since the member 24 can only exert the pressure of the spring Y upon the pumping diaphragm unit X, the stroke of the pumping diaphragm unit will be dependent upon the pressures acting against the diaphragm. More specifically, the stroke of the pumping diaphragm X will only be enough to keep the delivery pressure up to its predetermined value. Any difference in stroke between the pumping diaphragm and the member 24 will be absorbed by the spring Y.

It is clear then, that with a device of this nature a fluctuating pressure of almost any characteristics can be introduced to the device and it will sort out and utilize only those portions of the pressure which are necessary to cause a flow from a supply to a consumer of sufficient volume to keep the delivery pressure constant and of predetermined value. The pressure of the delivery can be varied by changing the relative values of the springs G and Y and since the amplitude of these variations is purely a dimensional problem, practically any delivery pressure desired can be obtained as long as it comes within the highest value of the fluctuating pressure. In case the fluctuating pressure is not capable of producing the desired delivery pressure, the actual delivery pressure will be proportional to the highest value of the fluctuating pressure.

Since the pumping and receiver chambers are separated by the diaphragms X and W, it is impossible for the substance being transferred to pass directly to the source of fluctuating pressure. However, to insure against possible damage to these diaphragms, thereby permitting such passage of the substance, the chambers F and L which are intermediate the pumping and pressure chambers, are connected to the air so that any substance which might pass through the diaphragms will merely have access to the free air. If this condition should arise, the air would also have access to the pressure and pumping chambers and this would impair the action of the apparatus and the trouble will be readily observed and corrected before damage could result.

The discharge ports 16 being practically at the geometrical center of the pressure head chamber R, will cause substantially the same volume of gas to be entrapped within the pressure head chamber no matter what position the device is in. This, in connection with the fact that the pressure head H can readily be constructed of transparent material, offers a convenient, simple and effective means of observing the flow and an accurate telltale of the operation of the device. For instance, if anything should happen which might reduce the delivery pressure, such as a leak of any nature within the device itself or within the pipes connecting it to the supply or the receiver, the pressure within the pressure head chamber will naturally fall off, and in case liquids are being transferred, this falling off in pressure would lower the level of the liquid within the pressure head. On the other hand, if for any reason too much pressure should be built up within the chamber, the level would rise. Each condition could be easily observed and the trouble investigated.

The pressure of the springs 9 and 12 can be adjusted to suit, the only limit being that the spring 9 must be capable of being overcome by the negative pressure produced by the spring G, and the spring 12 by the positive pressure produced by the spring Y. It is clear then, that the valves will work in any direction and the device need not have any fixed position relative to the supply or consumer because there could not, under any circumstance, be an uncontrolled flow through the device under usual conditions of installation.

These points and the fact that the device is of simple and reliable construction give a device which is particularly adapted to aeronautical installations where it is imperative to prevent the spread of dangerous fuels and to keep the pressure of delivery to the carbureter constant no matter what position the plane may be flying in. These conditions are handily met and, in addition, ease of observation is introduced and since the action of the device does not depend upon the air-tight condition of the supply tank, operation will continue even though this tank should be pierced or acquire any other leak. The device can also be used with facility in vehicle and stationary installations.

In Fig. 2 I have illustrated an embodiment of my invention also operated by a fluctuating pressure. As in the case of Fig. 1, the pressure head is transparent and integral with the pumping member, but the control member differs from that used in Fig. 1 in that the fluctuating pressure is introduced directly to both the pumping and control diaphragms, the amount of pressure being governed by the action of an adjustable spring used in connection with the control diaphragm, and the control valve.

I have shown the diaphragm of both the pumping and control members as simple disks, but any of the forms I shall describe hereinafter might be used with equal facility. The pumping diaphragm 31 carries at its center the disks 32 and 33. The members are provided with means for fastening the diaphragm and disks together, making an air-tight unit. The diaphragm is clamped at its periphery between the members 34 and 35 by screws 36. The members 34 and 35 have concave surfaces receding from the clamping rim and forming a recess or chamber in which the diaphragm 31 is free to vibrate. The diaphragm divides the recess into two separate chambers, the pumping chamber 37 and the pressure chamber 38. The rigid walls of the chambers limit the stroke of the pumping diaphragm. The member 34 is recessed to receive a compression spring 39 which normally keeps the pumping diaphragm against the stopping surface of the member 35. Two ports are provided in a recess of the member 34, one the inlet port 40 and the other the outlet port 41. The inlet port 40 leads to the inlet check valve 42 and the outlet port 41 leads to the outlet check valve 43. Both of these valves are of the ball type seated in metal and positively held against their seats by springs 44 and 45. The inlet check valve 42 is seated in the plug 46 under the pressure of the spring 44, the valve passageway being horizontal. The plug 46 is screwed into the member 34, making a tight joint against a gasket between the plug and its retainer, the plug being provided with guides for the valve. With this construction the only access to the pumping chamber 37 at this point is through the inlet check valve 42 and since this valve is normally held seated under spring pressure, it will only yield to inward pressures of sufficient value to overcome the spring. The pipe 47 is screwed into the cap 48 which in turn is threaded into the member 34, being brought home against a gasket between it and the casting. This cap also carries a cupped shape screen 49 which is intermediate the valve 42 and pipe 47. Since all these joints are air-tight and the pipe 47 leads to the supply, it is clear that any flow past the valve 42 must be from the supply via the pipe 47 through the screen 49 around the valve 42 and into the pumping chamber 37. The outlet check valve 43 is similar to the inlet check valve 42 except that it works in the opposite direction, seating directly in the member 34. This valve is held against its seat by a spring 45 which is backed up by a plug 50, this plug being screwed into the member 34. It is clear then, that this valve will only yield to outward pressures that are capable of overcoming the spring 45. Any flow past this valve will either pass through the port 51 into the pressure head chamber 52, or through the opening 53 in the center of the plug 50, through the cupped shape screen 54 to the pipe 55. The pipe 55 is screwed into the cap 56 and the cap is screwed up against a gasket making an air-tight seal between it and the member 34. Therefore all of the flow through the plug 50 must pass through the pipe 55 and hence to the consumer. Any flow through the port 51 will be confined within the pressure head chamber 52 because this chamber is also air-tight. The pressure head is made up of the transparent member 57 and the cap 58 which clamps the members 57 and 34 tightly together. There is a gasket between the cap 58 and the member 57 and between the member 57 and the casting 34. Any discharge from the pressure head chamber 52 also has access to the pipe 55. The control diaphragm 59 is similar to the pumping diaphragm 31, carrying at its center the disks 60 and 61. Passing through the disks 60 and 61 is a threaded member 62, the upper end of which receives a nut 63 whereby the disks and diaphragm are clamped together to make an air-tight unit. The nut 63 is provided with a valve releasing pin 64.

The control diaphragm 59 is clamped at its periphery between the members 35 and 65 by means of the screws 66, making an airtight joint. As in the case of the pumping diaphragm, the clamping members 35 and 65 are dished out to form a recess or chamber in which the diaphragm is free to vibrate. These members are dimensioned so as to act as stops for the control diaphragm. The control diaphragm divides the recess formed between the members 35 and 65 into the two chambers 67 and 68. Chamber 68 is connected to the chamber 38 by the port 69 and the chamber 67 has access to the air through the port 70, the size of this port being varied by a plug 71. The control diaphragm is normally forced against the stopping surface of the member 35 by the spring 72. This spring is contained within the screw 73 which must adjust the spring 72 to a pressure greater than that exerted by the spring 39. The adjustment of the spring and regulation of the port 70 governs the delivery pressure. The screw 73 is screwed into the member 65 and is locked in any desired position by the circular lock nut 74. This screw carries the port 70. The spring 72 in forcing the control diaphragm unit against the stopping surface of the member 35, makes the valve releasing pin 64 push the control valve 75 off its seat, giving the chambers 68 and 38 access to the pipe 76 through the conical screen 77 and the port 78. The control valve 75 is held against the valve releasing pin 64 by the spring 79 which is backed up by the member 35. This spring will cause the valve 75 to seat in the plug 80 if the pin 64 recedes. A gasket between the plug 80 and the member 35 makes the only passageway at this point through the port in the plug 80. Therefore pressure can normally enter the chambers 68 and 38 past the valve 75 until the control diaphragm has been caused to recede and then the control valve blocks the entrance of any further pressure.

It should be noted that the surfaces of the chambers 37 and 68 are channelled at 81 so as to prevent sticking of the diaphragms, due to seating of the same in their upward movement, for were the pressure above the diaphragms at the limit of their upward movement, only imposed upon the center of the diaphragms it might not be sufficient to cause the diaphragms to recede.

In this case, I have also provided the bracket 82 for the purpose of mounting.

It will be evident from the foregoing detailed description of this figure that initially the following conditions exist:

The pumping chamber 37 is of maximum volume.

The pressure chambers 38 and 68 are of minimum volume.

The control valve 75 is open.

The inlet and outlet check valves 42 and 43 respectively are closed.

If the pressure chamber of the device is now connected to a source of fluctuating pressure by the pipe 76 and the pumping chamber connected to a supply by the pipe 47 and indirectly through the pressure head to a receiver by the pipe 55, the following action will take place:

The first impulse of pressure will pass the open control valve 75 and enter the chamber 68, passing through the port 69 to the chamber 38. Now, if the pressure introduced is sufficient to operate the device, both the control and pumping diaphragms which form the flexible walls of the chambers 68 and 38, respectively, will recede before the pressure, and the following actions will take place:

First: The control diaphragm 59 will recede before the pressure and compress the spring 72 until the valve releasing pin 64 moves enough to allow the control valve 75 to close and cut off the pressure, or until the pressure of the spring 72 balances the fluctuating pressure;

Second: The pumping diaphragm 31 will recede before the pressure until the sum of the pressure built up by reducing the volume of the pumping chamber in this way, and the reaction of the spring 39 acting together, equalizes the fluctuating pressure, or until the diaphragm moves through its full stroke and comes to a stop against the member 34.

If the pressure built up in the pumping chamber during this stroke is sufficient to overcome the spring 45, the outlet check valve 43 will open and there will be a flow from the chamber. This discharge, after leaving the pumping chamber, will pass through the pipe 55 to the receiver, and at the same time a part of it will be by-passed through the port 51 into the pressure head chamber 52 where it will trap any gas or air therein and compress it until the pressure built up is equal to the delivery pressure.

It is clear that since the spring 72 controls the amount of pressure in the chambers 38 and 68 and this pressure is acting upon the pumping diaphragm, the delivery pressure is dependent upon the strength of the spring 72. The effective strength of this spring may be varied at will by adjusting the member 73 and therefore, practically any delivery pressure desired can be obtained. The flow from the pumping chamber will continue until the pressure forcing this flow is no longer capable of overcoming the spring 45 and then the outlet check valve 43 will close and the supply will be cut off. This completes the first cycle of operation.

When the fluctuating pressure has risen to the maximum, reversed and fallen below the pressure in the chambers 68 and 38 sufficient for this pressure to overcome the spring 79, the control valve 75 will open again and the pressure in the chambers 68 and 38 will fall off with the following results: The spring 72 will return the control diaphragm 59 to its normal position and again hold the control valve 75 open. The spring 39 will recover any deflection of the pumping diaphragm unit and return this diaphragm to its normal position or return the diaphragm until the negative pressure created by enlarging the pumping chamber in this way equals the pressure of the spring 39. Under ordinary conditions, however, the spring 39 will be sufficient to recover the full stroke of the pumping diaphragm at all times. If the pumping chamber is enlarged enough to reduce the pressure therein sufficient for the pressure on the supply to overcome the spring 44, it will open the inlet check valve 42 and there will be a flow from the supply to the pumping chamber. This flow will continue to fill the pumping chamber and the pressure therein will rise until the difference in pressure between the supply and the chamber is no longer sufficient to overcome the spring 44 and then the valve 42 will reseat and cut off the flow. During this intake stroke, there will be no discharge from the pumping chamber. However, the receiver will continue to be fed during the intake stroke by the supply under pressure in the pressure head. By arranging the relative volume of the pumping chamber and pressure head so that the discharge of the pressure head will overlap the discharge of the pumping chamber the delivery pressure is maintained practically constant. The diaphragms returning to their former positions in this way return the elements of the device to their normal positions and complete the second cycle of operation.

If the fluctuating pressure continues to fall off after the elements have again returned to their normal positions, both the control and pumping diaphragms will merely bear that much harder against the stopping surfaces of the member 35 but will have no effect upon the operation of the device. As long as the fluctuating pressure is fed to the device, the pumping and control diaphragms will vibrate in unison with the fluctuations of this pressure as described above. The stroke of the control diaphragm will be practically constant while the stroke of the pumping diaphragm will vary to meet the demands of a constant delivery pressure. The changes in volume produced in the chamber 67 by the vibrations of the control diaphragm 59 will have little effect upon the actuation of the diaphragm because this chamber has free access to the air through the port 70 and the changes in its volume will have little effect upon the pressure in the chamber.

From the above it is obvious that with a device of this nature a fluid can be transferred in a uniform flow of practically any predetermined pressure. Further, the device having a transparent pressure head offers a constant check on the delivery pressure.

As in Fig. 1, the device need occupy no definite position relative to either the supply or the consumer and the construction of the valve is such that under no condition can there be an uncontrolled flow through the device. This device is particularly desirable in installation in which the delivery pressure must be changed frequently.

By the provision of the plug 71 it is evident that the port 70 can be sealed and the volume of the chamber 67 so designed that vibrations of the diaphragm 59 would fluctuate the pressure in this chamber and thereby hinder the motion of the diaphragm. If the delivery pressure is known, it would be possible to design the chamber 67 so that the reaction of the air in the chamber upon motion of the diaphragm would be equivalent to the reaction of the spring 72. Therefore the spring 72 may be dispensed with and yet the control features brought out in the description of this figure be availed of. The means acting against the control diaphragm 59 in this case is merely defined as an air pressure instead of a spring pressure. In hard service it is desirable to back up the diaphragm with a uniformly distributed pressure which pressure can be created in the chamber 67 by sealing the port 70.

In Fig. 3 is an elevation in section of an embodiment of my invention operated by a fluctuating pressure. As in the case of Fig. 2, Fig. 3 is provided with a transparent pressure head which is integral with the pumping member, all of the discharge, however, passes through this head instead of having only a portion of it by-passed thereto.

The member 85 of this figure corresponds to the member 34 of Fig. 2 and is provided with a column 86 having a recess 87 for the reception of a spring 88, which spring cooperates with a laminated diaphragm 82 clamped between the member 85 and a member corresponding to the member 35 of Fig. 2, corrugations 83 being provided between the laminations at the center of the diaphragm and those at its periphery. Any desired number of laminations may be used. The spring retaining recess 87 communicates with the inlet and outlet check valves 89 and 90, respectively, through the ports 91 and 92, respectively. The outlet check valve 90 seats directly in the column 86 under the pressure of the spring 93, this spring being held in place by the plug 94. The outlet check valve chamber communicates with the pressure head chamber 95 through the ports 96. The pressure head chamber is made up of a pressure head 97 and a cap 98. The pipe 99 which leads to the receiver is screwed into the cap 100 which in turn is screwed into the member 85. The cap 100 is provided with a conical screen 101 and it is clear that any flow past the outlet check valve 90 will pass through the ports 96 into the pressure head chamber 95 and by way of port 102 through the screen 101 to the pipe 99 which will deliver it to the consumer. Adjacent the inner end of the supply pipe 103 is a cupped shape screen 104. The inlet check valve 89 is positively seated by a spring 105.

If the apparatus illustrated in the upper part of Fig. 2, that is the pumping diaphragm and the mechanism carried by the member 34, were removed and the apparatus of Fig. 3 substituted, and the device connected to a supply and receiver by the pipes 103 and 99 and then to a source of fluctuating pressure, all of the discharge would pass through the pressure head, the fluid flowing past the valves 89 and 90 through ports 96 into the pressure head chamber 95 by way of port 102 to the pipe 99 connected to the receiver, any excess fluid remaining in the pressure head chamber 95 where it builds up a pressure until the predetermined delivery pressure is reached when the valve 90 will close.

Fig. 4 shows a modification of the member 35 of Fig. 2. This member, designated 110 in Fig. 4, differs from the similar member of Fig. 2 in that the fluctuating pressure necessary to operate the device is built up within the member by a plunger 111 under the action of a cam 112 and a spring 113 instead of having the fluctuating pressure introduced to the device from some outside source by a pipe such as in Fig. 2. The plunger 111 is of simple piston construction, recessed to receive the spring 113 which is of the ordinary compression type. This plunger may be actuated by any desired force but for the purpose of illustration I have shown the cam 112 which may be driven by any external force. It is clear that since the spring 113 keeps the plunger 111 continually pressed against the surface of the cam 112, this plunger will follow the cam and a reciprocating motion will be imparted to the piston upon actuation of the cam. Oil grooves 114 have been provided for affording lubricating means for the plunger.

Now if the member 35 of Fig. 2 be replaced by the member 110 of Fig. 4 and the device is then connected up as described in connection with Fig. 2, with the exception that the pipe 76 is omitted and in its place we use the cam 112 which will oscillate the plunger 111. Oscillations of the piston will introduce a fluctuating pressure to the diaphragms of the device with the same effect as brought out in the description of operation of Fig. 2 and as long as the plunger 111 is actuated a fluctuating pressure will be introduced to the device, causing a controlled flow to pass from a supply to a receiver and a constant and even delivery pressure of any predetermined value will be produced. It will be obvious that if desired the plunger and control chamber may be so proportioned as to dispense with the control valve entirely.

The cam 112 might be driven by an electric motor or any other means but with a construction of this character attention is directed to its adaptability for use with the cams of an internal combustion engine. It is evident that this device might be built into the base of such a motor or attached thereto, insuring a positive and efficient fuel supply system.

Referring now to Fig. 5, it will be seen that the same involves no pressure head corresponding to the pressure head of Fig. 3, and comprises a member 114 similar to the member 85 of Fig. 3, said member being provided with a column 115 recessed to receive a compression spring 116 adapted to cooperate with the diaphragm 117 held between the member 114 and an adjacent member 118. The diaphragm is provided with two disks 119 and 120 held together and to the diaphragm by a screw-threaded member 121 carrying at its lower end a valve-controlling pin 122 which bears against a valve 123 and normally holds the valve open. The spring 116 cooperating with the diaphragm is guided by a plug 126 held in place in the column 115 by a set-screw 127. The inlet valve mechanism of this apparatus comprises an inlet check valve 128 positively seated by a spring 129 which valve opens inwardly toward the pumping chamber 130 and a control or pressure regulating valve 131 opening in the opposite direction and positively seated by a spring 132, the tension of this last-named spring being adjustable by means of a plug 133 held in adjusted position by a set screw 134. The spring 129 is carried by a screw 135. 136 designates a supply pipe adapted to be connected to any suitable source of supply, this pipe communicating with the chamber 137, within which the springs controlling the valves 128 and 131 are located and which chamber is placed in communication with the pumping chamber 130 when the valve 128 is lifted. The pumping chamber 130 is also adapted to be placed in communication with a discharge pipe 138, this communication being controlled by an outlet valve 139 positively seated by a spring 140. Obviously it is unnecessary to construct the valves as illustrated, that is to say, concentric with each other, the object sought being to provide two valves in this chamber, one of which will function as a pressure control valve.

Access to the valves 123, 128, 131 and 139 may be had by removing the plugs 125, 141 and 142 without necessitating the removal of the pipes 142, 136 or 138.

The operation of this apparatus is obvious, it is believed, from the foregoing. The diaphragm 117 is vibrated due to fluctuating pressure supplied through the pipe 142, the pressure supplied being controlled by the valve 123 automatically, this valve seating when the diaphragm has reached the end of its upward stroke. On the return stroke the valve 128 will open and permit fluid to flow through the pipe 136 past the valve and to the pumping chamber, from which it will be expelled past the outlet valve 139 through the discharge pipe 138 on the next upward stroke of the diaphragm. As the diaphragm can be moved only a certain predetermined distance upwardly, due to the fact that the walls of the chamber within which it is confined, prevents its further movement, and as after a predetermined travel or deflection, the valve 123 will close, it follows that fluid will be discharged from the device substantially continuously provided the fluctuations are sufficiently rapid and any excess pressure tending to build up in the chamber 130 will be relieved by lifting of the valve 131 so that the pressure at which the fluid is discharged will be practically constant.

Fig. 6 shows a sectional view of a modification of my device which may be adapted to Fig. 5.

The apparatus of Fig. 6 can be used in place of the member 118 and its component parts of Fig. 5, the diaphragm unit of Fig. 5 being replaced by the similar unit of Fig. 6. In this figure 143 corresponds to the member 114 of Fig. 5 while the member 148 corresponds to 118 of Fig. 5 carrying in this instance, however, the plunger 106 operated by a cam 149. The diaphragm is a simple disk 144 carrying at its center the members 145 and 146. The clamping member 147 passes through the disks 145 and 146 and diaphragm 144 holding the disks and diaphragm securely to each other. The diaphragm will be clamped at its periphery as described in the detailed description of Fig. 5. The plunger is a sliding fit in the member 148 and is ringed at 150 to provide lubricating means. The diaphragm unit acts upon this plunger 106 under the pressure of a spring 151 which corresponds to spring 116 of Fig. 5 and causes this plunger to follow the motion of the cam 149. I have provided also ports 152 communicating with the atmosphere and with the chamber 153 to relieve the pressure on one side of the diaphragm 144. I have also provided stops 154 for limiting the movement of the plunger 106. Now, if the apparatus of Fig. 6 is used in connection with the pumping and control members of Fig. 5, the same general results will be accomplished as brought out in the description of the operation of said figure, the only difference being that the device will be operated by a cam driven by some external force instead of a fluctuating pressure. This construction is simpler than that of Fig. 5 and where a device of this character is desirable and a cam action is available, the device of Fig. 6 offers a most inexpensive piece of apparatus for the work it performs, that is the causing of a controlled flow from one point to another and delivering the substance being transferred under a predetermined pressure of constant value without imposing upon the device any conditions of installation relative to its positioning with respect to the other members of the installation.

Fig. 7 shows a construction which can be used with Fig. 1. The diaphragm unit of this figure comprises a laminated diaphragm comprising a lamination 157 provided with laminations 158 and 159 at the periphery thereof, all of which laminations are clamped between the members 155 and 156. Disks 160 and 161 are also provided at the center of the diaphragm, being secured to each other by a stud 162 and nut 163. This gives a laminated diaphragm much the same as a laminated spring and with the same effect in that the curvature of deflection is distributed over the whole surface of the diaphragm. In this way the angular bend at the critical points is greatly reduced and hence the life of the diaphragm is increased, until by experiment I have proven that in use with any of the types of my invention described herein its life will be practically indefinite even though an excessively long stroke is used and the device is subjected to hard usage. The disks should all be clamped together at the center of the diaphragm and so arranged that the larger disk be adjacent the continuous diaphragm and the succeeding laminæ graduated down as far as desired. The ring shaped disks should be graduated the same with respect to size but should be clamped at the periphery of the diaphragm and recede in the opposite direction. The relative proportions of the disks and rings can be varied to meet different installations. This type of diaphragm increases the cost of the device very little and will add a degree of safety and reliability to it which will be appreciated in the finer installations. The spring 164 cooperates with the diaphragm. The extension 165 of the member 156 is bored to receive a slidable sleeve 166, the upper end of which is adapted to engage the disk 161 carried by the diaphragm. Within the sleeve is a slidable member 167 adapted to engage a cam 168 and to be reciprocated thereby, this member being held in engagement with said cam by a spring 169, the upper end of said spring engaging a stop 170 formed on the wall of the sleeve 166, which stop also limits the outward movement of the member 167. This member carries a stud 171 on which the spring 169 is mounted, the head of which stud is adapted to engage the stop 170, the lower end of the stud being secured into the member 167. It will be seen that the stud 171 takes up the initial pressure of the spring 169 so that in normal position of the device the spring does not act against the spring 164. It is clear, then, that if the cam 168 is rotated, the member 167 will be caused to vibrate and this will impart impulses through the spring 169 to the diaphragm unit. These impulses will tend to make the diaphragm unit vibrate. Vibrations of the diaphragm unit as described before, will cause a flow from the supply to the receiver and a delivery pressure will be built up. This pressure will resist vibration of the diaphragm unit and when the delivery pressure is built up to the predetermined value the spring 169 is designed so that it can no longer overcome this resistance and it will yield and absorb the oscillations caused by the cam 168 instead of transmitting further vibrations to the pumping diaphragm unit which would build the pressure up further. It is clear then, that with a control of this nature, the member 167 will vibrate with a constant stroke but the stroke of the member 166 and the diaphragm unit will only be sufficient to build up the predetermined delivery pressure and any difference in these strokes will be absorbed by the spring 169.

In Fig. 8 I have shown an embodiment of the apparatus of Fig. 7 and which modified apparatus as in the case of Fig. 7, is applicable to Figs. 1 or 2 for example. This apparatus comprises members 172 and 173 between which is clamped the periphery of a corrugated diaphragm 174. The column 175 receives a spring 176 similar to the spring G of Fig. 1, the lower end of which spring is adapted to engage a member 177 engaging a disk 178 carried by the diaphragm. The spring 176 receives a movable sleeve 179 corresponding to the sleeve 1 of Fig. 1, the lower end of this sleeve being provided with a flange 180 between which flange and the member 177 the disks 178 and 181 and the diaphragm 174 are clamped. Carried within the sleeve 179 is a hollow plunger 182 corresponding to the plunger 24 of Fig. 1, movement of which plunger is resisted by a spring 183. This plunger is received by a control plunger 184 and its lower end is adapted to be engaged by said plunger. The control plunger is vibrated by fluctuating pressure admitted to the system through the pipe 185 which of course, it is understood, is to be connected to any suitable source of fluctuating pressure. The control plunger is preferably provided with grooves 186 for lubrication. Ports 187 are provided back of the control plunger for the purpose of preventing the building up of pressure back of said plunger and in this connection it will be noted that ports 188 are provided in the plunger 182 for the same reason. It will be obvious that if desired this plunger arrangement may be provided with a control valve as is the control diaphragm W in Fig. 1, if desired, but in some instances it may be desirable to use the construction of the figure just described.

There are some installations in which it would be desirable for the purpose of observation or other reasons, to have the pressure head of the device remotely connected to it instead of being built into the device itself, as heretofore described. For this reason I have provided a separate pressure head as shown in Fig. 9. It would be a simple matter to modify any type of my invention as so far described to allow the discharge of the pumping chamber to be led to the pressure head by a pipe of any desired length instead of through a port built into the device itself. The pipe leading from the device obviously may be connected to either the cap 189 or 190 of the construction of Fig. 9. The cap to which this pipe is connected I will designate the intake side of the pressure head and the other cap the discharge side. The discharge cap in any case will be connected to the receiver by a pipe the same as in the other figures described. The cap 189 is a simple turning which is threaded to receive a pipe and recessed at the end of the threading so as to receive the screen 191. The boss 192 which encases the screen is threaded on the outside so that the cap may be screwed into the member 193. The face at the extremity of this thread is turned forming another recess in which a gasket is placed and when the cap is screwed home, this gasket bears against the member 194 and forms an airtight seal with it. The member 194 is a rigid, transparent spherical shell. It is evident that in this way it is possible to secure an air-tight spherical enclosure, the only opening to which is through ports 195 located as near as possible at the geometrical center of the sphere. The cap 190 is drawn home against a beveled metal seat 196 provided in the member 193, and carries a screen 197 at the end of the pipe 198. It is evident that with this construction any flow through the pressure head will be strained at two places, to wit: at screen 191 and screen 197. Any inward flow will have access to the pressure head chamber 199 through the ports 195 and when this flow rises so as to cover these ports pressure will be built up within this chamber and the reactionary force of this pressure will have the same action with regard to producing a constant discharge as was brought out in the other descriptions of the action of the pressure head. The member 193 is provided with an extension 200 which is drilled, for the purpose of mounting, as shown at 201. This pressure head being similar to the one described in the operation of Fig. 1 offers all the advantages made clear in that description and in addition permits of a remotely connected pressure head which in some cases will facilitate installation and in most cases will offer a more convenient means of observation.

In Fig. 10 I have shown another type of pressure head intended for use in connection with my device. In this figure the member 202 is a shell casting embossed and threaded at the bottom and to receive a pipe fitting, the other end of this member 202 being adapted to receive a pipe 203 and a plug 204 which are interchangeable. The lower end of the member 202 is threaded as already noted to receive a pipe fitting comprising a cap 205 and member 206 forming a "union" construction whereby loosening of the cap 205 will permit of the member 206 being rotated. The member 206 carries a pipe 207 and plug 208 which are interchangeable and by providing the union just mentioned it is obviously possible to lead the pipe 207 in any desired direction. In this structure I have provided a screen 209. The member 202 is cut away at 210 for the purpose of observation. If the discharge of any type of my device is led to the member 202 and member 206 is connected to a receiver, the discharge will have to pass through the chamber 211 and will build up a pressure therein. This pressure will react during any interval in the discharge from the pumping chamber and thereby keep the delivery pressure constant. This action is similar to the action of the pressure head described in the previous figures.

In Fig. 11 I have shown a type of my invention wherein the receiver is supplied under gravitational pressure. The pumping and control members of this figure depend upon the principle of operation brought out in Fig. 1 although I may use any of the other principles. The casting 212 is here modified so as to form an auxiliary chamber 213 instead of forming a receptacle for a pressure head. The outlet check valve 214 of this device is similar to the one described in Fig. 1 but discharges through the port 215 directly into the auxiliary chamber 213 instead of into a pressure head. This auxiliary chamber has an outlet through the pipe 216. The auxiliary chamber is enclosed at the top by the member 217 which is fastened by the screws 218 to the top of the projection of the member 212 which forms the chamber. The cap 219 is screwed into the member 217 in such a way that when it is brought home there will still be a leakage path through the ports 220 under the cap to the free air. Operation of the pumping member will cause a flow from the supply through the pipe 221 to the device and this flow will be discharged from the outlet check valve 214 into the chamber 213. The discharge will next pass to the receiver via the pipe 216. Since the chamber 213 has free access to the air, changes of level in the chamber will have practically no effect upon the air pressure therein. The discharge will continue and that portion of it which is not utilized by the receiver will tend to fill the chamber. The substance being transferred will rise in the chamber until it produces a head therein, the pressure of which is equivalent to the delivery pressure for which the device is adjusted. Then, as is the case of Fig. 1, there will be no further discharge until this pressure falls off sufficient for the discharge pressure to overcome the spring 222 again. Then the discharge will again tend to restore the head in the chamber and this action will continue until the predetermined level is again reached. Since the spring 222 can be made very light, the level and hence the delivery pressure will be practically constant. It is evident that if the apparatus described in Fig. 2 or 3 were used with the auxiliary chamber 213, the delivery pressure might be varied because variation of the discharge pressure as could be adjusted by the member 73 will vary the level in the chamber 213 and this in turn will vary the head under which the receiver is being supplied. It is evident that with this type of my invention, as long as the fluctuating pressure is introduced to the device, there will be a flow from the supply to the pumping chamber and discharge to the auxiliary chamber 213 wherein a sufficient head will be built up to produce the desired delivery pressure.

This type of my invention is desirable for installations where an extremely even delivery pressure is required and where at times the receiver will require a sudden increase in output which the device might not be able to produce immediately if a supply were not stored up and ready for instant discharge. This condition might arise if we should wish to flood a carbureter immediately. With a device of this nature the receiver can draw on the supply in the auxiliary chamber 213 before the device is in operation. This will satisfy the need, in some cases of flooding a carbureter of a motor before the motor is started, instead of an auxiliary pump.

In Figs. 12 and 12^A I have shown an application of my device in which the same is shown as part of a carbureter, thereby providing a self-feeding carbureter of the float type which will draw fuel from any remote supply whether it is above or below the float chamber and deliver it to the float chamber under any predetermined pressure. The construction at the left of this figure designates any conventional type of present day carbureter. From an inspection of this figure it will be seen that I have provided therein a supply pipe 224, discharge 225 leading to the carbureter, and a pipe 226 adapted to be connected to any suitable source of fluctuating pressure desired. The member 227 provides the auxiliary chamber 228. The outlet check valve 229 seats in the column 230 which forms a part of the casting 231, corresponding to the casting A of Fig. 1. Carried within the chamber 228 is a float 232, the column 230 extending through the same and being spaced therefrom, ports 233 being provided in the walls of said column. The chamber for the valve 229, which is provided by the column 230 and a cap 234 contains a spring 235 normally positively seating the outlet check valve. This chamber is provided with an opening at the top thereof through which passes a control rod 236 for controlling the flow of the material being transferred past the outlet check valve 229. The rod above the float 232 is threaded and receives a slidable nut 237 which nut is free to slide but is held against rotation relative to a member 238 which is threaded into the cap 239 of the member 227 and adapted to be adjusted vertically thereof. The threads of the rod 236 and that of the member 238 are of the same pitch. The control rod 236 is forked at its upper end and receives one arm of a floating lever 240 pivoted at the cap 239, which lever permits a vertical adjustment of the rod but prevents its rotation. The member 238 carries at its lower end a threaded member 241 threaded thereto and which threaded member supports a pair of float controlled weights 242, these weights being attached to said member at 243 and having their inner ends supported by the lower end of the sliding nut 237. It will be apparent that inasmuch as the threads of the control rod 236 and those of the adjusting member 238 are the same, that if the latter be turned to cause the same to move vertically, the relative position of the control rod 236 and the control valve 229 will not be affected but the weights 242 will have been moved upwardly so that the float 232 will have to be raised that much higher thereafter in order to engage these weights. Of course this operation could be reversed by moving the member 238 in the opposite direction.

Upon operation of the device there will be a discharge past the outlet check valve 229 and through the ports 233 into the chamber 228. This discharge will pass through the discharge outlet to the jet of the carbureter 244. Any surplus discharge will tend to fill the chamber 228. The level in this chamber will rise until the float 232 commences to rise. When this float rises enough to come in contact with the float controlling weights 242, any further motion of the float will lift the weights and through a pivoting action of their arms will force the nut 237 downwardly. The rod 236 will then approach the outlet check valve 229. When the float has risen to the predetermined level the rod 236 will have moved downwardly sufficiently to hold the outlet check valve closed and there can be no further discharge. As the carbureter draws upon the supply in the chamber 228 the level therein will fall and the float controlling weights will drop and lift the rod 236 with the result that the outlet check valve will again be free to operate. After the predetermined level is reached the float has to move very little to affect the outlet check valve, and since the level in the chamber 228 determines the delivery pressure, and since the level is controlled by the float 232, the carbureter will be supplied under a practically constant and uniform gravitational delivery pressure. This pressure can be varied in two ways, one by the adjustment of the discharge pressure which will determine how high the level must rise before the float through the rod 236 will be able to hold the outlet check valve closed, and second, by the adjustment of the position of the nut 237 on the rod 236. The latter can be accomplished by loosening the set screw 245 and positioning the nut on the rod to any desired point. This will control the amount the float will have to rise before the rod 236 takes effect upon the outlet check valve and since the travel of the float determines the level in the chamber, both of these adjustments will vary the head under which the carbureter is being supplied.

A device of this nature is very dependable and will satisfy the needs of the most exacting installation.

In Fig. 13 I have shown a modification of my device in which the consumer is supplied under a built-up pressure but one in which an auxiliary chamber 246 is employed from which a receiver can be supplied under gravitational pressure prior to the time the built-up pressure becomes effective. The member 247 is similar to the member 227 of Fig. 12 and a perforated disk 248 is held in position in this member by the ridge 249. At the center of this disk there is fastened a rod 250 which acts as a guide for the float 251, this rod being held in place in the disk by the nut 252. The bushing 253 which is fastened at the center of the float 251 acts as a guiding bearing for the rod 250 and is threaded at the top and to receive the valve retaining cup 254, this cup carrying the valve 255 made of cork or any other suitable material. This same condition holds true with the float, the only requirement being that it must be capable to float in the substance being transferred. The valve 255 is normally below the projection 256 formed integral with the cap 257 of the casing 247 and the valve port 258 in this projection has free access to the air under the plug 259 and through the ports 260. The plug 259 is screwed into the cap 257.

When due to the operation of the device, the level starts to rise in the chamber 246, the substance therein will be fed to the consumer under a gravitational pressure which is dependent upon the head in the chamber. Since the chamber 246 normally has access to the air the rising level will not build up a pressure in the chamber. When the level rises sufficiently for the float to be lifted enough to seal the port 258, the remaining volume of air in the chamber will be entrapped and any further rising of the level will compress this air, the chamber thereafter functioning as a pressure head. If at any time the level falls off sufficient for the valve 255 to open the port 258, the receiver will again be supplied under gravitational pressure.

With a device of this nature the receiver will usually be supplied under a built up pressure but if this pressure should fall off for any reason such as shutting down the operation of the device, the receiver will still be supplied if so desired by an auxiliary supply contained in the chamber 246. While with a device of this nature it usually would not be necessary to change the gravitational delivery pressure, this may be accomplished if desired by adjusting the position of the valve 255 in the float.

If for any reason it should be desirable to have a device from which the receiver can be supplied under either gravitational or built-up pressure, this end can be accomplished by modifying Fig. 13 as shown in Fig. 14. In this figure the plug 261 is adapted to receive the cap 262, the latter being screwed to the former. Passageway is maintained as in Fig. 13 from the air to the chamber corresponding to the chamber 246 of Fig. 13, it being understood that the member 263 in the present figure corresponds to the member 257 of Fig. 13. A rod 264 extends through the cap 262 and plug 261 and carries adjacent its lower end a valve 265 adapted to seat in the port 266, corresponding to the port 258 of Fig. 13. This rod is capable of vertical movement manually, which movement is resisted by a spring 267 which spring tends normally to maintain the rod in the position shown in the present figure. When the rod is in this position the pin 268 at its extreme lower end is above the lowermost portion of the projection on the cap 263 and the valve 265 is unseated. The rod 264 is so dimensioned that if it is pushed downward the pin 268 will interfere with the closing of the valve (not shown) corresponding to the valve 255 of Fig. 13 before the valve 265 seats, and before the threaded portion 269 of the rod 264 comes in contact with the threads 270 in the member 261. If the rod is pushed down sufficiently, the threads will meet and then if it is turned, the threads will continue their downward motion until the valve 265 is seated. This will seal the only opening to the chamber corresponding to the chamber 246 of Fig. 13 and the casing corresponding to 247 of Fig. 13 will become a pressure head.

It is clear, then, that by the proper adjustment of the rod 264 and the discharge pressure the consumer can be supplied under gravitational or built-up pressure as desired. In addition to this, if built-up pressure is being used the pressure in the chamber may be released instantly by pushing down the rod 264 and if this member is screwed down the port 266 is closed off and the chamber is converted into a fixed pressure head as in comparison to one sealed by the valve (not shown) corresponding to 255 of Fig. 13.

There are numerous ways in which my device may be installed. I have shown several of the more general installations and I will describe the relations of the members of them in brief.

In the descriptions of the installations it should be kept in mind that in each figure I describe, I have shown some specific modification of my device, but it is evident that any of the other modifications applicable to that installation might be used with facility.

I wish to make clear that the installations described herein are purely illustrative and especially those parts of the installations indicating the manually operated pump. The pump, if used, may be of any standard make but any type of special apparatus incorporating the means depicted will also come within the scope of my invention.

In Fig. 15 I have shown an internal combustion engine 271, the carbureter 272 of which is to be supplied by my device. I have chosen in this illustration a type of my device similar to that shown in Fig. 1. This device is located intermediate the supply 274 and the carbureter, the inlet check valve side being connected to the supply by the pipe and the discharge side to the carbureter or receiver by the pipe D. These relative positions, however, are arbitrary because as described heretofore, my device will operate without any definite relation to the other members of the installation. The pressure chamber is connected to a cylinder of the engine by the pipe 275, the control valve being intermediate the chamber and the motor. When the motor is in operation the fluctuating pressure produced by the cylinder will be transmitted to my device and it will cause a transfer of fuel from the tank to the carbureter.

If it should be desired to flood the carbureter at any time, as might be the case just prior to starting the motor, I have provided an auxiliary hand pump 276 for this purpose. An ordinary standard pump such as shown, can be used in this connection, providing the flow of the pipe S is led through the pump, the inlet side being connected to the supply and the outlet side to the device. These valves will offer practically no resistance to the flow from the supply tank to the device. Now, if it be desired to prime the device or to flood the carbureter, it is merely necessary to operate the pump by hand and this will cause a flow from the supply to the device whereby with a pump of this nature, since the flow is in the operative direction, enough pressure can be created to overcome the check valves. The flow, therefore, will pass through the device and to the consumer. The pressure built up at this point will be sufficient to flood most any carbureter. It is clear that this will leave the device primed and it will therefore be in a position to continue the flow immediately the motor supplies it with a fluctuating pressure.

As another method of priming attention is directed to Fig. 15ᴬ in which I have shown a pump 281, the inlet side of which is connected by a pipe 282 directly to the pumping chamber of the fluid transfer device, while the outlet is introduced by pipe 283 into the line connecting the device to the consumer or receiver. It is obvious that actuation of the pump will draw the material being transferred from the supply 274 through the device to the pump 281 and force it from the pump to the consumer and the pressure head. The pressure head will make the discharge to the consumer uniform.

In Fig. 16 I have shown another installation. In this figure I have used as a transfer apparatus that modification of my device which may be made up of a combination of the pressure head of Fig. 9 and apparatus of Fig. 5. The device as shown, therefore, is without an integral pressure head. In this figure 284 represents the supply, 285 the motor and 286 the carbureter. My device is shown at 287 and a pressure head similar to that described in Fig. 9 is shown at 288. For the purpose of illustration I have chosen to show the supply lower than the carbureter and my device intermediate them with its remotely connected pressure head above both the supply and consumer. The pipe 289 connects the supply to the inlet check valve of my device and its discharge 290 is led to the upper connection of the pressure head 288. The lower outlet of the pressure head 288 is connected to the consumer 286 by the pipe 291. Fluctuating pressure is introduced to the device from the cylinder of the motor 285 by the pipe 292.

Now, when the device is operated, there will be a flow from the supply to the device and from the device to the pressure head which can be located at any point convenient for observation. The flow will proceed from here to the carbureter or receiver under the predetermined delivery pressure. For the purpose of priming the device or flooding the carbureter or receiver, I have illustrated in Fig. 16 a pump 294 connected to the supply 284 and by a connection 296 to a pipe 291 connecting the pressure head 288 and carbureter 286, the inlet check valve of the pump being intermediate the plunger and the supply and the outlet check valve intermediate the plunger and the aforementioned pipe 291. Operation of the pump will cause a flow of fluid from the supply 284 to the pressure head 288 and the consumer 286, the pressure head 288 tending to create a uniform discharge. Any flow which tends to back up through the pressure head 288 will be arrested by the outlet check valve of the device which seats against a flow in this direction. After the pump has performed its function, a valve 295 which is intermediate the outlet check valve of the pump and the pressure head and the carbureter may be closed and any further transfer will be direct from the supply to the device and will not pass through the pump 294.

In Fig. 17 I have shown an installation of my apparatus, wherein a carbureter or receiver 297 of an engine 298 is supplied by a device similar to that illustrated and described in connection with Fig. 12, a remote sight feed device 299 which is really a negative pressure head, being provided. The supply is taken from the supply tank 300, the pipe 301 leading to the upper part of the head 299 and a pipe 224 leading from the opposite end of this head to the supply side of the device. Fluctuating pressure is introduced to the device from a cylinder of the engine by means of pipe 226. A valve 302 is provided in the pipe 226 whereby the pressure introduced to the device from the engine of the cylinder may be adjusted. In this case I have provided a priming device similar to that shown and described in connection with Fig. 16 and it will therefore not be necessary to describe the same here.

In Fig. 18 I have shown another type of installation in which I have utilized that type of my device similar to the illustration in Fig. 11. In this case the device is one which supplies the receiver or consumer under gravitational pressure. Therefore, the device is located above the receiver 303 and the supply 304 is shown below the device and the receiver. The inlet check valve of the device is connected to the supply by the pipe 221. The discharge side of the device is connected to the receiver by the pipe 216, a sight feed 217 being provided in this line. Fluctuating pressure is introduced to the device by the pipe 305 from a cylinder of a motor 306. Operation of the device will cause a flow from the supply through the pipe 221 to the device 212 and from the device to the receiver under gravitational pressure through the pipe 216.

I have shown in this case a pump 307 used for the purpose of operating the device by hand before the motor is started. When it is desirable to operate the device by hand this way the valve 308 should be turned so that it will give passageway from the pump to the device and shut off passageway from the motor to the device. Then, if the pump is actuated, the fluctuating pressure produced in this way will cause a flow the same as when the valve is turned the opposite way and the fluctuating pressure produced by the motor passes through the valve to the device. With this auxiliary pump it is possible to prime the device for the purpose of flooding the carbureter or receiver at any time at which the supply in the device is too low to perform this function.

In Fig. 19 I have shown still another installation in which I have elected to illustrate a mechanically operated conception of my invention. The device as shown at 309 is similar to the one used in Fig. 16 with the exception that instead of being operated by a fluctuating pressure it is actuated by one of the cams 310 of the motor 311 as illustrated. In this installation I have combined a remotely connected pressure head type of device 312 with a gravitational feed 313. The pipe 314 connects the inlet check valve of the transfer apparatus to the supply 315. The pipe 316 connects the outlet check valve of the transfer apparatus to the upper connection of the pressure head 312, the lower connection of the pressure head being connected to the auxiliary reservoir 313 by the pipe 316'. The pipe 317 connects this reservoir to the receiver or carbureter 318. The reservoir 313 can be similar to any of the auxiliary chambers I have previously described, the only modification necessary being that the inlet and outlet ports are connected by pipes instead of being contained in the pumping member of the device. Operation of the device will cause a flow from the supply 315 to the receiver and the latter can be supplied under either gravitational or built-up pressure or both, at will depending upon which type of auxiliary reservoir I employ. Because of the possibility of the receiver being supplied under gravitational pressure, the auxiliary reservoir 313 is placed higher than the carbureter or receiver.

Any of the manually operated features brought out in the previous descriptions can be employed in this case and in addition I have shown another phase of this feature. The pump 319 may be connected as indicated, to the pipes 314 and 317, a check valve 322 being provided in the latter. If the pump is operated it will cause a flow from the supply directly to the receiver.

In all of the figures operated by a fluctuating pressure the delivery pressure might also be adjusted to some extent by controlling the size of the port which introduces the fluctuating pressure to the control valve and pressure chamber, as shown at 302 in Fig. 17. It is evident that if the size of the passageway leading to the pressure chamber is reduced, the amount of pressure which will pass through this passageway in a given time and under a given pressure will also be reduced. Therefore, if the highest value of the fluctuating pressure is approximately equal to the delivery pressure or the alternations in the pressure are extremely rapid, it is possible with a shut-off of this nature to control, to some extent, the pressure which will be built up in the pressure chamber and this in turn will control the delivery pressure.

It will be obvious from the foregoing that I have provided a fluid transfer device whereby fluid may be transferred continuously at a constant predetermined pressure, regardless of the location of the point from which the fluid is taken relatively to the receiving means. It will be obvious also that the device is operative under all conditions, no matter at what angle the apparatus as a whole may be disposed or what position the transfer apparatus bears relative to the supply and receiving means.

While I have shown several embodiments of my invention, they are shown and described merely for the purposes of illustration, and it is to be understood, therefore, that changes may be made in the apparatus illustrated by others skilled in this art within the purview of my invention.

What is claimed as new is:

1. In a fluid-transfer apparatus the combination of a supply means, a receiving means and a transfer device operable by fluctuating pressure for transferring fluid from the supply to the receiving means, said transfer device being operable independently of its position with respect to the receiving means.

2. In a fluid-transfer apparatus the combination of supply means, a carburetor and a transfer device operable by fluctuating pressure for delivering fluid from the supply means to the carburetor at substantially constant pressure, said transfer device being operable independently of its position with respect to the carburetor.

3. In an apparatus for transferring fluid, a supply means, a receiving means, and a flexible member operable by fluctuating pressure for effecting a transfer of fluid from the supply to the receiving means without passing the fluid thru said flexible member, the apparatus being operable independently of the relative positions of the flexible member and receiving means.

4. In a fluid-transfer apparatus the combination of a supply means, a receiving means, and a diaphragm pump operated by fluctuating pressure for transferring fluid from the supply to the receiving means, said pump being operable independently of its position relative to the receiving means.

5. In combination an internal combustion engine and a fluid-transfer apparatus operated by the cylinder pressures of said engine to cause a flow of fuel to the engine, said transfer apparatus being operable independently of its position relative to the engine.

6. In combination an internal combustion engine and a diaphragm pump operable by fluctuating pressure to cause a flow of fuel to said engine, the pump being operable independently of its position relative to the engine.

7. In combination an internal combustion engine and a diaphragm pump operated by the cylinder pressures of said engine to cause a flow of fuel to the engine, said pump being operable independently of its position relative to the engine.

8. In combination an internal combustion engine, a fluid supply tank and means operated by the fluctuating pressures in the engine cylinders for effecting a transfer of fluid to said engine at constant pressure under all conditions of load and speed of the engine, said transfer device being operable independently of its position relative to the engine.

9. In an apparatus for transferring fluid, a supply means, a receiving means, and a diaphragm for effecting a transfer of fluid from the supply to the receiving means without passing the fluid thru the diaphragm, said apparatus being operable independently of the relative positions of the diaphragm and receiving means.

10. In combination an internal combustion engine, a fuel tank and a diaphragm for effecting a transfer of fuel from the said tank to the engine without passing the fuel thru the diaphragm, said apparatus being operable independently of the relative positions of the diaphragm and engine.

11. In a fluid-transfer apparatus, a supply means, a receiving means, and independently operable diaphragms for effecting a transfer of fluid from the supply to the receiving means independently of the relative positions of the diaphragms and receiving means.

12. In a fluid-transfer apparatus the combination of a supply means, a receiving means and a transfer device operable by fluctuating pressure for transferring fluid from the supply to the receiving means, said transfer device being operable independently of its position with respect to the supply means.

13. In a fluid-transfer apparatus the combination of a supply means, a carburetor and a transfer device operable by fluctuating pressure for transferring fluid from the supply means to the carburetor, delivering the fluid to the carburetor at substantially constant pressure, said transfer device being operable independently of its position with respect to the supply means.

14. In a fluid-transfer apparatus, the combination of a source of supply, means for receiving fluid from said supply, and means operating under fluctuating pressures for effecting a transfer of fluid from said supply to said receiving means, said means being operable independently of the relative positions of the supply and receiving means.

15. In combination, a carburetor, a fluid supply tank, and means operated by fluctuating pressures for effecting a transfer at constant pressure of the fluid from said tank to the carburetor, said means being operable independently of the relative positions of the carburetor and supply tank.

16. In combination, an internal combustion engine, a supply tank, and a diaphragm for effecting a transfer of fluid at constant pressure from the supply tank to the engine without passing the fluid thru the diaphragm, the diaphragm being operable to cause such a flow independently of the relative positions of the supply tank and engine.

17. In combination, an internal combustion engine, a carburetor, a fluid-supply tank, and an imperforate diaphragm operated by the engine for transferring fluid at constant pressure from the supply tank to the carburetor, said diaphragm being operable to effect this transfer of fluid independently of the location of the diaphragm relative to the carburetor and tank.

18. In a fluid-transfer apparatus the combination of a supply means, a receiving means and a transfer device operable by fluctuating pressures for transferring fluid from the supply to the receiving means independently of its normal position.

19. In a fluid-transfer apparatus the combination of a supply means, an internal combustion engine and a transfer device operable by fluctuating pressures and independently of its normal position for transferring fluid from the supply means to the said engine.

20. In combination, a carburetor, a fluid supply tank, means for creating fluctuating pressures, pumping apparatus actuated by said fluctuating pressures for transferring fluid from said tank to said carburetor at a constant pressure and independently of its position relative to said carburetor and tank, said transfer means functioning positively to prevent a flow of fluid to said source of fluctuating pressure.

21. In a fluid-transfer apparatus, the combination of a supply, fluid-receiving means, a fluid-transfer device, a pumping diaphragm within said fluid-transfer device adapted to be actuated to cause a flow of fluid from the supply to the receiving means, a pressure-head for receiving fluid, and a positively-controlled outlet valve controlling the passage of fluid to said pressure head and said receiving means.

22. In a fluid-transfer apparatus, the combination of a supply, a fluid-receiving means, a fluid-transfer device intermediate said receiving means and supply, a pressure-head, a positively controlled inlet valve controlling the passage of fluid from the supply to the transfer-device, and a positively-controlled outlet valve controlling the passage of fluid from said transfer device to the pressure-head and to the fluid-receiving means.

23. In a fluid-transfer apparatus, the combination of a supply, a fluid-receiving means, a fluid-transfer device intermediate said receiving means and supply, a pumping diaphragm within said transfer device adapted to be actuated to cause a flow of fluid at constant pressure from the supply to the receiving means, a pressure-head for receiving fluid, and a positively-controlled outlet valve controlling the passage of fluid to said pressure-head and said receiving means.

24. In a fluid-transfer apparatus, a supply means, a receiving means, a diaphragm device operated by fluctuating pressure for effecting a transfer of fluid from the supply to the receiving means, and a pressure-head intermediate the supply and receiving means for insuring a uniform transfer of the fluid.

25. In a fluid-transfer apparatus, a supply means, a receiving means, a diaphragm device for effecting a transfer of fluid from the supply to the receiving means, and a pressure-head intermediate the supply and receiving means for ensuring a uniform transfer of the fluid, said apparatus being operative independently of the relative positions of the diaphragm and receiving means.

26. A pressure-head comprising a spherical shell, a hollow member extending thru the same, inlet and outlet openings at the extremities of said member, a port being provided in said member at approximately the geometrical center of said sphere communicating with said inlet and outlet openings.

27. A pressure-head comprising a spherical shell provided with a port at approximately its geometrical center.

28. In combination, a carburetor, a fluid supply means, means operable by fluctuating pressure for transferring fluid from said supply means to said carburetor at constant pressure, and manually operable auxiliary means remote from said carburetor for effecting a transfer of fluid to said carburetor.

29. In a fluid transfer apparatus, the combination of a source of supply, a receiving means, and means for effecting a transfer of fluid from the said supply to the said receiving means comprising a plurality of independently movable diaphragms.

30. In a fluid-transfer apparatus, the combination of a supply source, a receiving means, and means comprising a plurality of independently movable diaphragms for effecting a transfer of fluid from the supply to the receiving means, the fluid being delivered at constant pressure.

31. In a fluid-transfer apparatus, the combination of a supply, a fluid-receiving means, a fluid-transfer device intermediate said receiving means and supply, a pumping diaphragm in a chamber in said transfer device operated by fluctuating pressure for causing a transfer of the fluid at constant pressure, a valve controlled by this pressure for controlling operation of said diaphragm, a positively-controlled inlet valve controlling the flow of fluid from said supply, and a positively-controlled outlet valve controlling the flow of fluid to the receiving means.

32. A fluid-transfer device comprising a pressure-head, positively seated inlet and outlet valves controlling ports leading to said pressure-head, a pumping diaphragm, a control diaphragm for operating said pumping diaphragm and adapted to be operated by fluctuating pressure, said diaphragms being operative to cause a flow of fluid from a source of supply exterior to the device by said inlet and outlet valves, discharging the fluid from the device at constant pressure.

33. A device of the character described, comprising a pumping diaphragm and a control diaphragm for causing a transfer of fluid at a constant pressure, a yielding connection between said diaphragms, means for applying fluctuating pressure to the control diaphragm to cause the pumping diaphragm to be actuated, and a valve for automatically controlling the application of fluctuating pressure to the control diaphragm.

34. In a device of the character described, the combination of a pumping diaphragm and a control diaphragm, each mounted in a chamber in the device, a flexible coupling connecting said diaphragms for transmitting only the desired pressure to the pumping diaphragm, and a control valve for controlling the pressure admitted to the chamber in which the control diaphragm is mounted, said valve automatically seating when the control diaphragm moves its full stroke.

This specification signed this 14th day of February, 1920.

LEON N. HAMPTON.